United States Patent [19]

Yamanaka et al.

[11] Patent Number: 5,504,741
[45] Date of Patent: Apr. 2, 1996

[54] DATA QUEUING APPARATUS AND ATM CELL SWITCH BASED ON SHIFTING AND SEARCHING

[75] Inventors: Hideaki Yamanaka; Hirotaka Saito; Munenori Tsuzuki; Hirotoshi Yamada, all of Kanagawa; Harufusa Kondoh, Hyogo; Kazuyoshi Oshima, Kanagawa; Hiromi Notani, Hyogo, all of Japan

[73] Assignee: Mitsubishi Denki Kabushiki Kaisha, Tokyo, Japan

[21] Appl. No.: 191,335

[22] Filed: Feb. 2, 1994

[30] Foreign Application Priority Data

Feb. 15, 1993 [JP] Japan .................................. 5-025280

[51] Int. Cl.$^6$ ............................. H04J 3/26; H04L 12/56
[52] U.S. Cl. .......................................... 370/58.2; 370/60.1
[58] Field of Search ......................... 370/60, 60.1, 58.1, 370/94.1, 58.2, 94.2, 110.1

[56] References Cited

U.S. PATENT DOCUMENTS 4,603,416  7/1986  Servel et al. ............................ 370/60

(List continued on next page.)

FOREIGN PATENT DOCUMENTS 0300876  7/1988  European Pat. Off. ..

(List continued on next page.)

OTHER PUBLICATIONS

Packet Switching Module, IBM Technical Disclosure Bulletin, vol. 32, No. 10B, Mar. 1990, pp. 176–178.
Oshima et al., "A New ATM Switch Architecture Based on STS-Type Shared Buffering and Its LSI Implementation", XIV International Switching Symposium, vol. 1, pp. 359–363, Oct. 1992.
Tamir et al., The 15th Annual Int. Symp. on Computer Arch., 30.5-2.6, 1988, Honolulu, US, pp. 343–354; "High performance multi-queue buffers for VLSI communication switches", p. 344, col. 2, line 2, p. 345, col. 1, line 24, p. 347, para. 3A, FIGS. 1 and 2.
Kuwahara et al., IEEE Int'l Conf. on Comm., BOSTONICC/89, Jun. 1989, Boston US; pp. 118–122, "A shared buffer memory switch for an ATM exchange", p. 119, para. 3.1, FIGS. 1 and 2.
Dieudonne et al., Int'l Switching Symposium 1987, Mar., 1987, Phoenix, US; pp. 367–372, "Switching techniques for asynchronous time division multiplexing (or fast packet switching)", pp. 370–371, para. 6, FIGS. 5 and 6.
Hui, J. Y., "A Broadband Packet Switch for Integrated Transport", IEEE J. on Selected Areas in Communications, vol. SAC–5, No. 8, pp. 1264–1273, Oct. 1987.
Y. S. Yeh et al., "The Knockout Switch: A Simple Modular Architecture for High Performance Packet Switching".
Yoshito et al., "Large Scale ATM Multi-Stage Switching Network with Shared Buffer Switches".
Globe Com '92, Dec. 6–9, 1992, vol. 3 of 3, Conference Record "High-Speed Switching Module for a Large Capacity ATM Switching System", pp. 123–126, H. Tomonaga et al.

(List continued on next page.)

*Primary Examiner*—Douglas W. Olms
*Assistant Examiner*—Min Jung
*Attorney, Agent, or Firm*—Wolf, Greenfield & Sacks

[57] ABSTRACT

A data queuing apparatus processes data switching and queuing using a smaller capacity memory, while reducing data discard and loss possibility. Received limited-length data at the input line is written in shift memories, which can shift the data to the next stage regardless of the destination of the data. Destination indicating bits, which indicate the destination of the data, are associated with each of shift memories. A search circuit detects an asserted bit among the destination indicating bits corresponding to the output lines. The data is extracted by a selector. Then the selector transmits the data to the desired output line, and the data stored in the previous stage of the shift memory is shifted. The memory is used in common with a plurality of output lines, so that a lower possibility of data discard and loss can be attained in a smaller capacity memory.

27 Claims, 36 Drawing Sheets

U.S. PATENT DOCUMENTS

| | | | |
|---|---|---|---|
| 4,692,894 | 9/1987 | Bemis | 364/900 |
| 4,730,305 | 4/1989 | Acampora et al. | 370/60 |
| 4,821,259 | 4/1989 | DeBruler et al. | 370/60 |
| 4,849,968 | 7/1989 | Turner | 370/94 |
| 4,851,991 | 7/1989 | Rubinfeld et al. | 364/200 |
| 4,920,534 | 4/1990 | Adelmann et al. | 370/94.1 |
| 4,935,922 | 6/1990 | Wicklund et al. | 370/60 |
| 4,949,301 | 8/1990 | Joshi et al. | 364/900 |
| 4,956,839 | 9/1990 | Torii et al. | 370/60 |
| 4,993,018 | 2/1991 | Hajikano et al. | 370/60 |
| 5,046,064 | 9/1991 | Suzuki et al. | 370/60 |
| 5,128,931 | 7/1992 | Yamanaka et al. | |
| 5,210,744 | 5/1993 | Yamanaka et al. | 370/60 |
| 5,291,482 | 3/1994 | McHarg et al. | 370/60.1 |

FOREIGN PATENT DOCUMENTS

| | | |
|---|---|---|
| 0279443 | 8/1988 | European Pat. Off. |
| 0292962 | 11/1988 | European Pat. Off. |
| 0299473 | 1/1989 | European Pat. Off. |
| 0336373 | 10/1989 | European Pat. Off. |
| 2-117241 | 5/1990 | Japan |
| 2-246646 | 10/1990 | Japan |
| 3-26038 | 2/1991 | Japan |
| 3-228146 | 10/1991 | Japan |
| WO86/02510 | 4/1986 | WIPO |
| WO88/07298 | 9/1988 | WIPO |

OTHER PUBLICATIONS

International Conference on Communications, 1987, Jun. 7–10, 1987 "An Asynchronous Time–Division Switched Network", pp. 22.2.1–22.2.5, Jean–Pierre Coudreuse—Michel Servel.

A Hit–less Protection Switching Method For ATM Switch by Takatoshi Kurano, Ryuichi Ikematsu, Takashi Tsutsui, and Fumio Akashi, Transmission Network Development Division, NEC Corporation, Autumn meeting of The Institute of Electronics, Info. & Comm. Eng.. B–486, 1991 (Brief translated included.).

A Study of a Hit–less Protection Scheme for ATM Equipment by T. Koyanagi, S. Ohta, M. Fukuda, H. Yamasita, K. Iguchi, N. Gonai, and K. Fukamachi, Fujitsu Laboratories Ltd., Fujitsu Tohoku Digital Technology, Fujitsu Kyushu Digitial Technology, Autumn Meeting of The Institute of Electronics, Info. & Comm. Eng.. B–487, 1991 (Brief translation included.).

FIG. 2

| | | TIME $\longrightarrow$ | | |
|---|---|---|---|---|
| (a) TIME SLOT VALUE | TIME SLOT 1 | TIME SLOT 2 | TIME SLOT 3 | TIME SLOT 4 |
| (b) INPUT LINE $1$ | DATA a (TO OUT. LN. $2_4$) | DATA b (TO OUT. LN. $2_1$) | DATA c (TO OUT. LN. $2_1$) | DATA d (TO OUT. LN. $2_1$) |
| (c) DEST. INPUT $\{3_4, 3_3, 3_2, 3_1\}$ | {1,0,0,0} | {0,0,0,1} | {0,0,0,1} | {0,0,0,1} |
| (d) SHIFT MEMORY $4_6$ | EMPTY | DATA a (SHIFT) | DATA b | DATA c |
| (e) DEST. IND. BIT $\{5_{64}, 5_{63}, 5_{62}, 5_{61}\}$ | {0,0,0,0} | {1,0,0,0} | {0,0,0,1} | {0,0,0,1} |
| (f) SHIFT MEMORY $4_5$ | EMPTY | EMPTY | DATA a | DATA b |
| (g) DEST. IND. BIT $\{5_{54}, 5_{53}, 5_{52}, 5_{51}\}$ | {0,0,0,0} | {0,0,0,0} | {1,0,0,0} | {0,0,1}→{0,0,0,0} |
| (h) SHIFT MEMORY $4_4$ | EMPTY | EMPTY | EMPTY | DATA a |
| (i) DEST. IND. BIT $\{5_{44}, 5_{43}, 5_{42}, 5_{41}\}$ | {0,0,0,0} | {0,0,0,0} | {0,0,0,0} | {1,0,0,0}→{0,0,0,0} |
| (j) SHIFT MEMORY $4_3$ | EMPTY | EMPTY | EMPTY | EMPTY |
| (k) DEST. IND. BIT $\{5_{34}, 5_{33}, 5_{32}, 5_{31}\}$ | {0,0,0,0} | {0,0,0,0} | {0,0,0,0} | {0,0,0,0} |
| ($\ell$) SHIFT MEMORY $4_2$ | EMPTY | EMPTY | EMPTY | EMPTY |
| (m) DEST. IND. BIT $\{5_{24}, 5_{23}, 5_{22}, 5_{21}\}$ | {0,0,0,0} | {0,0,0,0} | {0,0,0,0} | {0,0,0,0} |
| (n) SHIFT MEMORY $4_1$ | EMPTY | EMPTY | EMPTY | EMPTY |
| (o) DEST. IND. BIT $\{5_{14}, 5_{13}, 5_{12}, 5_{11}\}$ | {0,0,0,0} | {0,0,0,0} | {0,0,0,0} | {0,0,0,0} |
| (p) OUTPUT LINE $2_1$ | | | | SEARCH DATA b |
| (q) OUTPUT LINE $2_2$ | | | | |
| (r) OUTPUT LINE $2_3$ | | | | |
| (s) OUTPUT LINE $2_4$ | | | | DATA a |

FIG. 3

| | TIME SLOT 5 | TIME SLOT 6 | TIME SLOT 7 | TIME SLOT 8 |
|---|---|---|---|---|
| (a) TIME SLOT VALUE | | | | |
| (b) INPUT LINE 1 | | DATA e (TO OUT. LN. $2_2$) | DATA f (TO OUT. LN. $2_1$) | DATA g (TO OUT. LN. $2_3$) |
| (c) DEST. INPUT $\{3_4, 3_3, 3_2, 3_1\}$ | {0,0,0,0} | {0,0,1,0} | {0,0,0,1} | {0,1,0,0} |
| (d) SHIFT MEMORY 46 | DATA d | EMPTY | DATA e | DATA f |
| (e) DEST. IND. BIT $\{5_{64}, 5_{63}, 5_{62}, 5_{61}\}$ | {0,0,0,1} | {0,0,0,0} | {0,0,1,0} | {0,0,0,1} |
| (f) SHIFT MEMORY 45 | DATA c | DATA d | EMPTY | DATA e |
| (g) DEST. IND. BIT $\{5_{54}, 5_{53}, 5_{52}, 5_{51}\}$ | {0,0,0,1} | {0,0,0,1} | {0,0,0,0} | {0,0,1,0}→{0,0,0,0} |
| (h) SHIFT MEMORY 44 | EMPTY | DATA c | DATA d | EMPTY |
| (i) DEST. IND. BIT $\{5_{44}, 5_{43}, 5_{42}, 5_{41}\}$ | {0,0,0,0} | {0,0,0,1} | {0,0,0,1} | {0,0,0,0} |
| (j) SHIFT MEMORY 43 | EMPTY | EMPTY | DATA c | DATA d |
| (k) DEST. IND. BIT $\{5_{34}, 5_{33}, 5_{32}, 5_{31}\}$ | {0,0,0,0} | {0,0,0,0} | {0,0,0,1} | {0,0,0,1} |
| (l) SHIFT MEMORY 42 | EMPTY | EMPTY | EMPTY | DATA c |
| (m) DEST. IND. BIT $\{5_{24}, 5_{23}, 5_{22}, 5_{21}\}$ | {0,0,0,0} | {0,0,0,0} | {0,0,0,0} | {0,0,0,1}→{0,0,0,0} |
| (n) SHIFT MEMORY 41 | EMPTY | EMPTY | EMPTY | EMPTY |
| (o) DEST. IND. BIT $\{5_{14}, 5_{13}, 5_{12}, 5_{11}\}$ | {0,0,0,0} | {0,0,0,0} | {0,0,0,0} | {0,0,0,0} |
| | | | | ↑SEARCH |
| (p) OUTPUT LINE $2_1$ | | | | DATA c |
| (q) OUTPUT LINE $2_2$ | | | | DATA e |
| (r) OUTPUT LINE $2_3$ | | | | |
| (s) OUTPUT LINE $2_4$ | | | | |

FIG. 4

TIME →

| | TIME SLOT 9 | TIME SLOT 10 | TIME SLOT 11 | TIME SLOT 12 |
|---|---|---|---|---|
| (a) TIME SLOT VALUE | 9 | 10 | 11 | 12 |
| (b) INPUT LINE 1 | | | | |
| (c) DEST. INPUT $\{3_4, 3_3, 3_2, 3_1\}$ | {0,0,0,0} | {0,0,0,0} | {0,0,0,0} | {0,0,0,0} |
| (d) SHIFT MEMORY 4₆ | DATA g | EMPTY | EMPTY | EMPTY |
| (e) DEST. IND. BIT $\{56_4, 56_3, 56_2, 56_1\}$ | {0,1,0,0} | {0,0,0,0} | {0,0,0,0} | {0,0,0,0} |
| (f) SHIFT MEMORY 4₅ | DATA f | DATA g | EMPTY | EMPTY |
| (g) DEST. IND. BIT $\{55_4, 55_3, 55_2, 55_1\}$ | {0,0,0,1} | {0,1,0,0} | {0,0,0,0} | {0,0,0,0} |
| (h) SHIFT MEMORY 4₄ | EMPTY | DATA f | DATA g | EMPTY |
| (i) DEST. IND. BIT $\{54_4, 54_3, 54_2, 54_1\}$ | {0,0,0,0} | {0,0,0,1} | {0,1,0,0} | {0,0,0,0} |
| (j) SHIFT MEMORY 4₃ | EMPTY | EMPTY | DATA f | DATA g |
| (k) DEST. IND. BIT $\{53_4, 53_3, 53_2, 53_1\}$ | {0,0,0,0} | {0,0,0,0} | {0,0,0,1} | {0,1,0,0}→{0,0,0,0} |
| (ℓ) SHIFT MEMORY 4₂ | DATA d | EMPTY | EMPTY | DATA f |
| (m) DEST. IND. BIT $\{52_4, 52_3, 52_2, 52_1\}$ | {0,0,0,1} | {0,0,0,0} | {0,0,0,0} | {0,0,0,1} |
| (n) SHIFT MEMORY 4₁ | EMPTY | DATA d | DATA d | DATA d |
| (o) DEST. IND. BIT $\{51_4, 51_3, 51_2, 51_1\}$ | {0,0,0,0} | {0,0,0,1} | {0,0,0,1} | {0,0,0,1}→{0,0,0,0} |
| | | | | ↑ SEARCH |
| (p) OUTPUT LINE 2₁ | | | | DATA d |
| (q) OUTPUT LINE 2₂ | | | | |
| (r) OUTPUT LINE 2₃ | | | | DATA g |
| (s) OUTPUT LINE 2₄ | | | | |

FIG. 7

|  | TIME → |  |  |  |
|---|---|---|---|---|
| (a) TIME SLOT VALUE | TIME SLOT 1 | TIME SLOT 2 | TIME SLOT 3 | TIME SLOT 4 |
| (b) INPUT LINE 1 | DATA a TO OUT. LN. $2_1, 2_4$ | DATA b TO OUT. LN. $2_2$ | DATA c TO OUT. LN. $2_1$ | DATA d TO OUT. LN. $2_1, 2_2$ |
| (c) DEST. INPUT $\{3_4, 3_3, 3_2, 3_1\}$ | $\{1,0,0,1\}$ | $\{0,0,1,0\}$ | $\{0,0,0,1\}$ | $\{0,0,1,1\}$ |
| (d) SHIFT MEMORY $4_6$ | EMPTY | DATA a | DATA b | DATA c |
| (e) DEST. IND. BIT $\{5_{64}, 5_{63}, 5_{62}, 5_{61}\}$ | $\{0,0,0,0\}$ | $\{1,0,0,1\}$ | $\{0,0,1,0\}$ | $\{0,0,0,1\}$ |
| (f) SHIFT DETECTOR $8_6$ | 0 | 1 | 1 | 1 |
| (g) SHIFT MEMORY $4_5$ | EMPTY | EMPTY | DATA a | DATA b |
| (h) DEST. IND. BIT $\{5_{54}, 5_{53}, 5_{52}, 5_{51}\}$ | $\{0,0,0,0\}$ | $\{0,0,0,0\}$ | $\{1,0,0,1\}$ | $\{0,0,1,0\} \rightarrow \{0,0,0,0\}$ |
| (i) SHIFT DETECTOR $8_5$ | 0 | 0 | 1 | $1 \rightarrow 0$ |
| (j) SHIFT MEMORY $4_4$ | EMPTY | EMPTY | EMPTY | DATA a |
| (k) DEST. IND. BIT $\{5_{44}, 5_{43}, 5_{42}, 5_{41}\}$ | $\{0,0,0,0\}$ | $\{0,0,0,0\}$ | $\{0,0,0,0\}$ | $\{1,0,0,1\} \rightarrow \{0,0,0,0\}$ |
| (l) SHIFT DETECTOR $8_4$ | 0 | 0 | 0 | $1 \rightarrow 0$ |
| (m) SHIFT MEMORY $4_3$ | EMPTY | EMPTY | EMPTY | EMPTY |
| (n) DEST. IND. BIT $\{5_{34}, 5_{33}, 5_{32}, 5_{31}\}$ | $\{0,0,0,0\}$ | $\{0,0,0,0\}$ | $\{0,0,0,0\}$ | $\{0,0,0,0\}$ |
| (o) SHIFT DETECTOR $8_3$ | 0 | 0 | 0 | 0 |
| (p) SHIFT MEMORY $4_2$ | EMPTY | EMPTY | EMPTY | EMPTY |
| (q) DEST. IND. BIT $\{5_{24}, 5_{23}, 5_{22}, 5_{21}\}$ | $\{0,0,0,0\}$ | $\{0,0,0,0\}$ | $\{0,0,0,0\}$ | $\{0,0,0,0\}$ |
| (r) SHIFT DETECTOR $8_2$ | 0 | 0 | 0 | 0 |
| (s) SHIFT MEMORY $4_1$ | EMPTY | EMPTY | EMPTY | EMPTY |
| (t) DEST. IND. BIT $\{5_{14}, 5_{13}, 5_{12}, 5_{11}\}$ | $\{0,0,0,0\}$ | $\{0,0,0,0\}$ | $\{0,0,0,0\}$ | $\{0,0,0,0\}$ |
| (u) SHIFT DETECTOR $8_1$ | 0 | 0 | 0 | 0 |
| (v) OUTPUT LINE $2_1$ |  |  |  | SEARCH ↑ DATA a |
| (w) OUTPUT LINE $2_2$ |  |  |  | DATA b |
| (x) OUTPUT LINE $2_3$ |  |  |  |  |
| (y) OUTPUT LINE $2_4$ |  |  |  | DATA a |

FIG. 8

| | TIME SLOT 5 | TIME SLOT 6 | TIME SLOT 7 | TIME SLOT 8 |
|---|---|---|---|---|
| (a) TIME SLOT VALUE | | | | |
| (b) INPUT LINE 1 | | DATA e TO OUT. LN. 2₁, 2₂, 2₃, 2₄ | DATA f TO OUT. LN. 2₃ | DATA g TO OUT. LN. 2₁ |
| (c) DEST. INPUT {3₄,3₃,3₂,3₁} | {0,0,0,0} | {1,1,1,1} | {0,1,0,0} | {0,0,0,1} |
| (d) SHIFT MEMORY 4₆ | DATA d | EMPTY | DATA e | DATA f |
| (e) DEST. IND. BIT {56₄,56₃,56₂,56₁} | {0,0,1,1} | {0,0,0,0} | {1,1,1,1} | {0,1,0,0} |
| (f) SHIFT DETECTOR 8₆ | 1 | 0 | 1 | 1 |
| (g) SHIFT MEMORY 4₅ | DATA c | DATA d | EMPTY | DATA e |
| (h) DEST. IND. BIT {55₄,55₃,55₂,55₁} | {0,0,0,1} | {0,0,1,1} | {0,0,0,0} | {1,1,1,1}→{0,0,1,1} |
| (i) SHIFT DETECTOR 8₅ | 1 | 1 | 0 | 1 |
| (j) SHIFT MEMORY 4₄ | EMPTY | DATA c | DATA d | EMPTY |
| (k) DEST. IND. BIT {54₄,54₃,54₂,54₁} | {0,0,0,0} | {0,0,0,1} | {0,0,1,1} | {0,0,0,0} |
| (l) SHIFT DETECTOR 8₄ | 0 | 1 | 1 | 0 |
| (m) SHIFT MEMORY 4₃ | EMPTY | EMPTY | DATA c | DATA d |
| (n) DEST. IND. BIT {53₄,53₃,53₂,53₁} | {0,0,0,0} | {0,0,0,0} | {0,0,0,1} | {0,0,1,1}→{0,0,0,1} |
| (o) SHIFT DETECTOR 8₃ | 0 | 0 | 1 | 1→1 |
| (p) SHIFT MEMORY 4₂ | EMPTY | EMPTY | EMPTY | DATA c |
| (q) DEST. IND. BIT {52₄,52₃,52₂,52₁} | {0,0,0,0} | {0,0,0,0} | {0,0,0,0} | {0,0,0,1}→{0,0,0,0} |
| (r) SHIFT DETECTOR 8₂ | 0 | 0 | 0 | 1→0 |
| (s) SHIFT MEMORY 4₁ | EMPTY | EMPTY | EMPTY | EMPTY |
| (t) DEST. IND. BIT {51₄,51₃,51₂,51₁} | {0,0,0,0} | {0,0,0,0} | {0,0,0,0} | {0,0,0,0} |
| (u) SHIFT DETECTOR 8₁ | 0 | 0 | 0 | 0 |
| (v) OUTPUT LINE 2₁ | | | | SEARCH DATA c |
| (w) OUTPUT LINE 2₂ | | | | DATA d |
| (x) OUTPUT LINE 2₃ | | | | DATA e |
| (y) OUTPUT LINE 2₄ | | | | DATA e |

FIG. 9

| | TIME SLOT 9 | TIME SLOT 10 | TIME SLOT 11 | TIME SLOT 12 | TIME SLOT 13 |
|---|---|---|---|---|---|
| (a) TIME SLOT VALUE | | | | | |
| (b) INPUT LINE 1 | DATA h TO OUT. LN. 2₄ | | DATA i TO OUT. LN. 2₃ | | |
| (c) DEST INPUT {3₄,3₃,3₂,3₁} | {1,0,0,0} | {0,0,0,0} | {0,1,0,0} | {0,0,0,0} | {0,0,0,0} |
| (d) SHIFT MEMORY 4₆ | DATA g | DATA h | EMPTY | DATA i | EMPTY |
| (e) DEST. IND. BIT {5₆₄,5₆₃,5₆₂,5₆₁} | {0,0,0,1} | {1,0,0,0} | {0,0,0,0} | {0,1,0,0} | {0,0,0,0} |
| (f) SHIFT DETECTOR 8₆ | 1 | 1 | 0 | 1 | 0 |
| (g) SHIFT MEMORY 4₅ | DATA f | DATA g | DATA h | DATA h | DATA i |
| (h) DEST. IND. BIT {5₅₄,5₅₃,5₅₂,5₅₁} | {0,1,0,0} | {0,0,0,1} | {1,0,0,0} | {1,0,0,0}→{0,0,0,0} | {0,1,0,0} |
| (i) SHIFT DETECTOR 8₅ | 1 | 1 | 1 | 1→0 | 1 |
| (j) SHIFT MEMORY 4₄ | DATA e | DATA f | DATA g | DATA g | EMPTY |
| (k) DEST. IND. BIT {5₄₄,5₄₃,5₄₂,5₄₁} | {0,0,1,1} | {0,1,0,0} | {0,0,0,1} | {0,0,0,1} | {0,0,0,0} |
| (ℓ) SHIFT DETECTOR 8₄ | 0 | 1 | 1 | 1 | 0 |
| (m) SHIFT MEMORY 4₃ | EMPTY | DATA e | DATA f | DATA f | DATA g |
| (n) DEST. IND. BIT {5₃₄,5₃₃,5₃₂,5₃₁} | {0,0,0,0} | {0,0,1,1} | {0,1,0,0} | {0,1,0,0}→{0,0,0,0} | {0,0,0,1} |
| (o) SHIFT DETECTOR 8₃ | 0 | 1 | 1 | 1→0 | 1 |
| (p) SHIFT MEMORY 4₂ | DATA d | EMPTY | DATA e | DATA e | EMPTY |
| (q) DEST. IND. BIT {5₂₄,5₂₃,5₂₂,5₂₁} | {0,0,0,1} | {0,0,0,0} | {0,0,1,1} | {0,0,1,1}→{0,0,0,1} | {0,0,0,0} |
| (r) SHIFT DETECTOR 8₂ | 1 | 0 | 1 | 1→1 | 0 |
| (s) SHIFT MEMORY 4₁ | EMPTY | DATA d | DATA d | DATA d | DATA e |
| (t) DEST. IND. BIT {5₁₄,5₁₃,5₁₂,5₁₁} | {0,0,0,0} | {0,0,0,1} | {0,0,0,1} | {0,0,0,1}→{0,0,0,0} | {0,0,0,1} |
| (u) SHIFT DETECTOR 8₁ | 0 | 1 | 1 | 1→0 | 1 |
| | | | | ↑SEARCH | |
| (v) OUTPUT LINE 2₁ | | | | DATA d | |
| (w) OUTPUT LINE 2₂ | | | | DATA e | |
| (x) OUTPUT LINE 2₃ | | | | DATA f | |
| (y) OUTPUT LINE 2₄ | | | | DATA h | |

FIG. 14

PRIORITY TABLE  30

| PRIORITY | VALUES SET BY THE HEADER CONVERTER |
|---|---|
| NO OUTPUT | 0 0 |
| LOW | 0 1 |
| MIDDLE | 1 0 |
| HIGH | 1 1 |

FIG. 15

COUNT TABLE  31

| OUTPUT LN. | PRIORITY | | |
|---|---|---|---|
| | LOW 01 | MIDDLE 10 | HIGH 11 |
| $2_1$ | 0 | 1 | 1 | → TO SEARCH CIR. $6_1$
| $2_2$ | 0 | 1 | 0 | → TO SEARCH CIR. $6_2$
| $2_3$ | 1 | 0 | 0 | → TO SEARCH CIR. $6_3$
| $2_4$ | 1 | 1 | 0 | → TO SEARCH CIR. $6_4$

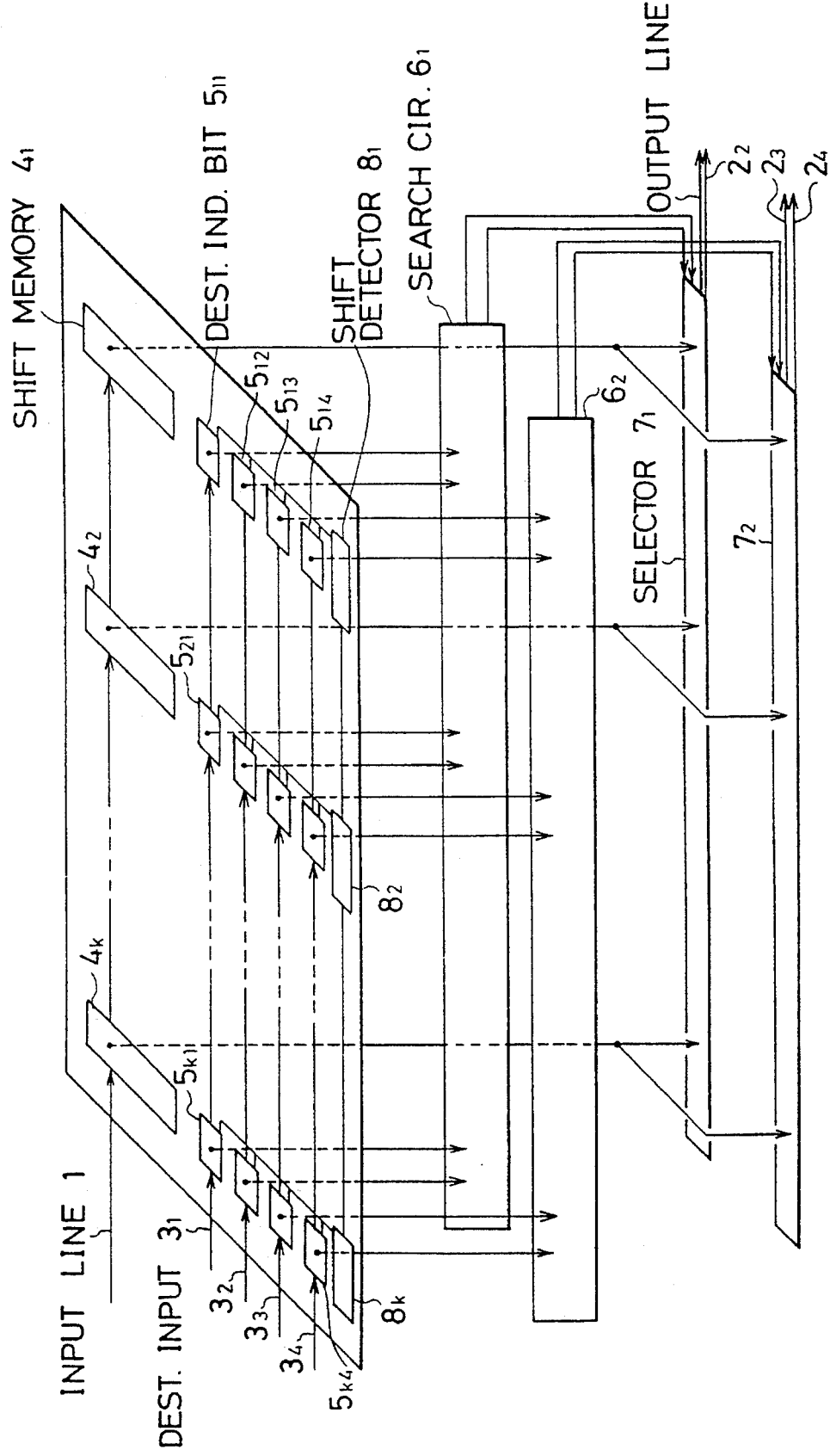

FIG. 19

| | TIME SLOT 1 | TIME SLOT 2 | TIME SLOT 3 | TIME SLOT 4 | TIME SLOT 5 | TIME SLOT 6 |
|---|---|---|---|---|---|---|
| SEARCH CIR. $6_1$ | OUTPUT LN. $2_1$ SEARCH | OUTPUT LN. $2_2$ SEARCH | OUTPUT LN. $2_1$ SEARCH | OUTPUT LN. $2_2$ SEARCH | OUTPUT LN. $2_1$ SEARCH | OUTPUT LN. $2_2$ SEARCH |
| SEARCH CIR. $6_2$ | OUTPUT LN. $2_3$ SEARCH | OUTPUT LN. $2_4$ SEARCH | OUTPUT LN. $2_3$ SEARCH | OUTPUT LN. $2_4$ SEARCH | OUTPUT LN. $2_3$ SEARCH | OUTPUT LN. $2_4$ SEARCH |
| SELECTOR $7_1$ | OUTPUT LN. $2_1$ TRANSMIT | OUTPUT LN. $2_2$ TRANSMIT | OUTPUT LN. $2_1$ TRANSMIT | OUTPUT LN. $2_2$ TRANSMIT | OUTPUT LN. $2_1$ TRANSMIT | OUTPUT LN. $2_2$ TRANSMIT |
| SELECTOR $7_2$ | OUTPUT LN. $2_3$ TRANSMIT | OUTPUT LN. $2_4$ TRANSMIT | OUTPUT LN. $2_3$ TRANSMIT | OUTPUT LN. $2_4$ TRANSMIT | OUTPUT LN. $2_3$ TRANSMIT | OUTPUT LN. $2_4$ TRANSMIT |

F I G. 21

| | TIME SLOT 1 | TIME SLOT 2 | TIME SLOT 3 | TIME SLOT 4 | TIME SLOT 5 | TIME SLOT 6 |
|---|---|---|---|---|---|---|
| SEARCH CIR. 6 | OUTPUT LN. 2₁ SEARCH | OUTPUT LN. 2₂ SEARCH | OUTPUT LN. 2₃ SEARCH | OUTPUT LN. 2₄ SEARCH | OUTPUT LN. 2₁ SEARCH | OUTPUT LN. 2₂ SEARCH |
| SELECTOR 7 | OUTPUT LN. 2₁ TRANSMIT | OUTPUT LN. 2₂ TRANSMIT | OUTPUT LN. 2₃ TRANSMIT | OUTPUT LN. 2₄ TRANSMIT | OUTPUT LN. 2₁ TRANSMIT | OUTPUT LN. 2₂ TRANSMIT |

FIG. 27

NO. OF SHIFT MEM. BIT FOR FLAG

PROPOSED = $B \cdot n \cdot (n + \log_2(B \cdot n))$ — BIT FOR ADDRESS / PROPOSED $$\text{FORMULA} = \frac{B \cdot n \cdot (n + \log_2(B \cdot n))}{B \cdot n^2 \cdot \log_2(B \cdot n)} \leftarrow \text{CONVENTIONAL}$$

$$= \frac{1 + \dfrac{\log_2(B \cdot n)}{n}}{\log_2(B \cdot n)} = \frac{1}{\log_2(B \cdot n)} + \frac{1}{n}$$

FIG. 28

|  | TIME SLOT 1 | | TIME SLOT 2 | | TIME SLOT 3 | |
|---|---|---|---|---|---|---|
| SHIFT MEM. 4₆ | EMPTY | EMPTY | DATA d | EMPTY | EMPTY | EMPTY |
| SHIFT MEM. 4₅ | DATA c | DATA c | EMPTY | DATA d | EMPTY | EMPTY |
| SHIFT MEM. 4₄ | DATA b | EMPTY | DATA c | EMPTY | DATA d | DATA d |
| SHIFT MEM. 4₃ | EMPTY | DATA b | EMPTY | DATA c | DATA c | DATA c |
| SHIFT MEM. 4₂ | DATA a | EMPTY | DATA b | DATA b | DATA b | DATA b |
| SHIFT MEM. 4₁ | EMPTY | DATA a | DATA a | DATA a | DATA a | DATA a |

CONVENTIONAL ADDRESS QUEUEING

FIG. 36 (PRIOR ART)

FORMULA $AQ = B \cdot n^2 \cdot \log_2(B \cdot n)$ $SBM = B \cdot n^2 \cdot X$ BITS

- B: BUFFER MEM. CAPACITY PER OUTPUT PORT (CELLS/PORT)
- X: NO. OF BITS PER CELL (BITS)
- n: NO. OF OUTPUT PORTS (PORTS)
- $\log_2(B \cdot n)$: NO. OF BITS PER ADDRESS (BITS)

FOR EXAMPLE

- B: 32-CELL MEM. CAPACITY PER OUTPUT PORT
- X: 424 BITS PER CELL
- n: 8 OUTPUT PORTS
- $\log_2(B \cdot n)$: 8 BITS $AQ = 32 \cdot 8^2 \cdot 8 = 16384$ BITS $SBM = 32 \cdot 8^2 \cdot 424 = 108544$ BITS

DATA QUEUING APPARATUS AND ATM CELL SWITCH BASED ON SHIFTING AND SEARCHING

BACKGROUND OF THE INVENTION

This invention relates to an address controller of a data switching apparatus and a data switching apparatus having a shared buffer for temporary storing, delaying, and switching a limited length of data, such as blocked-frame information of various kinds of multimedia, for example, voice, data, image, etc., and fixed-length packets.

DESCRIPTION OF THE RELATED ART

In ATM (Asynchronous Transfer Mode) communication systems, continuous signals such as line signals or voice signals, and bursty signals such as data signals or motion video are divided into fixed lengths of data, appended to a header indicating destination information, thus forming a packet. This packet is called a "cell" in ATM. Data are transferred in the same packet form. Synchronization of frames is not needed between terminal equipment and a channel, and the operating speed of the terminal equipment and the channel can be set independently. This system can be applied to many kinds of terminal equipment. But a high-speed packet switch receives packets at random, and a lot of packets may be addressed to one destination, so that packets need to be queued for processing to prevent loss of information.

To solve this problem, for example, a high-speed packet switch is proposed and shown in FIGS. 5 and 6 of "PRELUDE: An Asynchronous Time-Division Switched Network," by Jean-Pierre Coudreuse and Michel Servel in International Conference on Communications, 1987, session 22, document No.2. This document relates to a high-speed packet switch of an asynchronous transfer mode (ATM) communication system for efficiently multiplexing and transmitting line switching data or packet switching data. A conventional data queuing apparatus is shown in a controller 16 according to the above document. FIG. 30 shows a block diagram of an example of the conventional data queuing apparatus.

In the figure, n (n>=2) input ports $11_1$–$11_n$ are provided for incoming fixed-length packets. Also provided are m (m>=2) output ports $12_1$–$12_m$ for outgoing packets. Packet multiplexer 13 multiplexes received packets. Memory 14 is provided for writing data in a predefined address. Data can be read from the memory by indicating a read address regardless of the order of writing data. Packet demultiplexer 15 demultiplexes read-out packets. The controller 16 controls switching packets.

The controller 16 is shown in detail in FIG. 31. The controller 16 has a conventional data queuing apparatus shown in FIG. 10 of the above document. FIG. 31 shows the conventional data queuing apparatus with a little deformation for an explanation. In the figure, a header converter 17 chooses an address for the received cell to write in the memory 14. It also detects the destination output ports $12_1$–$12_m$ for the packet, and converts the received header into a new header. Cyclic selector 20 selects information sequentially from the conventional data queuing apparatus.

The conventional data queuing apparatus 18 is in the controller 16. An input line 1 receives an address for writing a packet in the memory 14. Destination inputs $3_1$–$3_m$ receive destination information. Output lines $2_1$–$2_m$ are provided for transmitting addresses after queuing of addresses. FIFO memories $19_1$–$19_m$ are provided corresponding to each of output ports $12_1$–$12_m$. The conventional data queuing apparatus 18 forms queues of the writing addresses of the received packets corresponding to the output ports $12_1$–$12_m$, where the addresses queue up for the output ports $12_1$–$12_m$ in the received order.

The packets arriving at these input ports $11_1$–$11_n$ of the high-speed packet switch are multiplexed by the packet multiplexer 13 and written in the memory 14. A header having destination information is transmitted to the controller 16. The header converter 17 determines from the header the destination output ports $12_1$–$12_m$ and converts the header into a new header. Addresses of the packets in the memory 14 are lined up according to the output ports $12_1$–$12_m$ by the data queuing apparatus. The FIFO memories $19_1$–$19_m$ are used in the conventional data queuing apparatus 18.

The packets are read from the memory 14 according to the addresses, which are read from the conventional data queuing apparatus 18. The packets are demultiplexed by the packet demultiplexer 15 and launched to the predetermined output ports $12_1$–$12_m$. As described above, the packets received at the input ports $11_1$–$11_n$ are transmitted to the desired output ports $12_1$–$12_m$, thus the packets are switched.

FIG. 32 shows another example of a conventional ATM switch named shared multibuffer ATM switch according to the invention described in "622 Mb/s 8×8 Shared Multibuffer ATM Switch with Hierarchical Queuing and Multicast Functions", GLOBECOM '93, session #40, December 1993 by Hideaki Yamanaka et al. Another conventional data queuing apparatus is address queues in the controller 16. When a cell comes to one of the input ports $11_1$–$11_8$, the ATM switch detects the header in the cell and transfers it to the controller 16. The incoming cell is written in one of the vacant addresses of the shared buffer memories (SBMs). This address is chosen in the controller 16. The controller 16 has plural address queues. Each address queue is for one of output ports.

Address queues are selected based on the destination of the cell. Then the write address is buffered in the selected address queues. On the other hand, the incoming cell is passed through a cross point switch 3201, transferred to a shared buffer memory (SBM), and stored there. The data stored in SBM are transmitted to one of the output ports $12_1$–$12_8$ based on the output direction from the controller 16. FIG. 33 shows the address queues by the FIFO memories in the controller 16.

FIG. 34 shows an example of an operation for multicast cells, which are to be multicasted to a plurality of the output ports. For processing the multicast cells, multicast cell counters (MCCs) are provided. The MCCs correspond to the data stored in the shared buffer memory (SBM) and indicate if the received data are multicast cells or not. For example, when an incoming multicast cell is stored in SBM $14_1$ in address A0 and this multicast cell is to be copied to two output ports, MCC 93 increments the counter value from "0" to "2" as shown in FIG. 34. Another cell stored in address B3 in SBM $14_2$ is a multicast cell destined for two output ports, and MCC 90 decrements the counter value from "2" to "0" after the cell in B3 goes out to two output ports. As the MCC 90 becomes "0", the address B3 is released and put in idle address pool. Though another cell destined for two output ports is stored in SBM $14_3$ as shown by MCC 92, it has been transferred to only one output port in this time slot. The MCC 92 decrements the counter value from "2" to "1". As the MCC 90 is not "0", the address C1 is not released. As a result, the cell in C1 can wait until the next slot for going out to the other destination port. In this way, the MCCs control to detect the release timing of addresses of SBM for multicast cells.

FIG. 35 shows a graph of memory capacity required by the shared buffer memories (SBMs) and the address queues (AQs), where B is the size of the buffer memories per output port (cells/port). AQs are an example of a conventional data queuing apparatus. FIG. 36 shows a formula for drawing this graph. The required memory capacity of the address queues (AQ) increases according to the increase of the number of the output ports. The memory capacity of the address queues (AQ) is tuned to be larger than the memory capacity of SBM when the output ports number 64 or more.

FIG. 37 shows some considerations relative to the design of high-speed ATM switches and large-scaled ATM switches. The operation speed must be increased in the high-speed ATM switches. Therefore, the number of addresses written in the address queues per second is increased in proportion to the operation speed, the number of the input ports, and the number of the output ports. As a result, the address queues or a data queuing apparatus is forced to operate at a high speed. And the number of the input ports and the output ports must be increased in large-scaled ATM switches. The memory capacity of the shared buffer memory must be increased as well. In accordance with these increases, the number and the lengths of the queues need to be increased. The number of address bits also needs to be increased. Thus, the total memory capacity of the address queues gets larger.

In the conventional data queuing apparatus configured as described above, for example, when the memory 14 has capacity to hold P number of packets, the FIFO memory 19 needs to have capacity of P number of addresses so as to prevent a loss of packets caused by an overflow of addresses. Therefore, the data queuing apparatus 18 needs a memory capacity sufficient to hold P times as many as m number of addresses as a whole, so that the scale of the apparatus becomes large.

SUMMARY OF THE INVENTION

The object of this invention is to solve the above problems. The invention provides an apparatus which does not need plural memories for storing data, but uses a common memory for storing data for all of the output ports. The capacity of the memory becomes smaller, so that the scale of the apparatus can also become smaller. In addition, the possibility of data loss can be reduced because of sharing effect.

A data queuing apparatus according to one aspect of the invention may include:

(a) a plurality of output lines for transmitting data;

(b) input means for receiving data with destination information which indicates at least one of the output lines;

(c) memory means, which is provided for the plurality of output lines, for storing data received at the input means; and (d) search and select means, which searches outgoing data for each output lines among the data stored in the memory means with the destination information, and selects the searched data in the memory means for the corresponding output line for transmitting.

Variations of this aspect of the invention may include the following.

In the data queuing apparatus according to the invention, the memory means may include:

(a) a plurality of shift memories for shifting data and storing data therein;

(b) a plurality of destination memories each of which corresponds to both each shift memory and each output line and stores the destination information of data therein.

In the data queuing apparatus according to the invention, the search and select means may include a plurality of search means each of which corresponds to each of the plurality of the output lines and searches destination information stored in the corresponding destination memories for finding data to transmit to the corresponding output line. In the data queuing apparatus according to the invention, the search and select means may further include a plurality of select means each of which corresponds to each of the plurality of output lines and selects data found by the search means and transmits data to the corresponding output lines.

The data queuing apparatus according to the invention may further include delete means for deleting data stored in the memory means after being selected and transmitted by the search and select means.

In the data queuing apparatus according to the invention, input means may receive data with destination information, indicative of destination output lines, and the delete means may delete data after they are transmitted to the plurality of output lines indicated by the destination information.

The data queuing apparatus according to the invention may further include a plurality of shift detectors, each of which corresponds to each of the shift memories, for requesting a previous shift memory to shift data when it detects selecting and transmitting of the data stored in the corresponding shift memory.

In the data queuing apparatus according to the invention, the input means may expect to receive data every time slot, which has predefined time length, the plurality of shift memories may shift data more than once every time slot, and the search and select means may search data once every predefined X (X>=2) time slot.

In the data queuing apparatus according to the invention, the input means may expect to receive data each time slot which has predefined time length, may include Y (Y>=2) number of input lines which are coupled to the Y number of shift memories respectively for receiving data once to the coupled shift memory for every time slot, and the plurality of shift memories may shift data at least Y number of times for every time slot.

In the data queuing apparatus according to the invention, the search and select means may include search means whose number is less than the number of output lines.

In the data queuing apparatus according to the invention, the search and select means may include select means whose number is less than the number of output lines.

In the data queuing apparatus according to the invention, the input means may receive a serial signal and may include serial-parallel converter for transforming the serial signal to the parallel signal, and the memory means may receive the parallel signal from the serial-parallel converter.

In the data queuing apparatus according to the invention, the shift memory and the destination memory may be coupled together as a memory unit.

A data queuing system according to another aspect of the invention may include:

(a) first data queuing apparatus for processing data having priority;

(b) second data queuing apparatus for processing data having different priority;

(c) data distributing means for transferring data to one of the first and second data queuing apparatuses based on the priority of received data.

Variations on this aspect of the invention may include the following.

In the data queuing apparatus, the input means may receive the destination information along with priority for processing data, the memory means may store the destination information and the priority, and the search and select means may search the destination information for selecting data based on the stored priority.

A data queuing apparatus according to yet another aspect of the invention may include:

(a) an input line for receiving a limited length of data defined by a predefined fixed time;

(b) a plurality of output lines for transmitting a limited length of data;

(c) destination input means, which corresponds to the input line, for receiving destination information which indicates one of the plurality of output lines corresponding to the data;

(d) a plurality of shift memories, which are connected serially, for storing received data and shifting stored data forward serially;

(e) a plurality of destination indicating bits, each of which corresponds to both of each of the shift memories and each of the output lines, and is asserted when the bit corresponds to a destination of data stored in one of the shift memories, for storing the destination received at the destination input means and shifting the stored destination synchronous with the shifting of the data stored in the corresponding shift memories;

(f) search circuits, each of which corresponds to each of the output lines, for searching backward for an asserted bit in the destination indicating bits; and (g) selectors for selecting data from the plurality of shift memories to the output lines based on search results of the search circuits.

The data queuing apparatus according to the invention wherein one of a limited length of data is transmitted to the plurality of output lines, may further include shift detectors, each of which corresponds to each of the shift memories, for detecting that all of the destination indicating bits which correspond to one of the shift memories are not asserted and directing next shift memory and next destination indicating bits to shift data and the destination forward.

A data queuing method according to the invention may include the steps of:

(a) receiving data with destination information from an input line every time slot;

(b) storing data with the destination information in a common memory in an order;

(c) searching the destination information in the order for destinations corresponding to each of a plurality of output lines;

(d) selecting data for each of the plurality of output lines based on a search result;

(e) transmitting selected data to each of output lines.

In the data queuing method according to the invention, the receiving step may include the steps of:

(a) checking if the common memory is full of data; and (b) discarding data received if the common memory is full of data.

The data queuing method according to the invention may further include the step of marking as deleted that data transmitted from the memory after the transmitting step.

In the data queuing method according to the invention, the storing step may include the steps of:

(a) checking if the common memory holds data marked as deleted;

(b) shifting other data in the common memory onto the data marked as deleted if the common memory holds the data marked as deleted;

In the data queuing method according to the invention, the searching step may include the step of repeating the receiving step and the storing step a plurality of times before searching the destination information.

An Asynchronous Transfer Mode switch according to yet another aspect of the invention, for switching cells, having destination information therewith, between input ports and output ports, may include:

(a) a shared multibuffer having addresses for storing cells;

(b) a controller having a data queuing apparatus providing the addresses, whereat the cells are stored in the shared multibuffer with the destinations of the stored cells to the data queuing apparatus, whereby the data queuing apparatus transmits the addresses of cells to be transmitted to the output ports.

An Asynchronous Transfer Mode switch according to yet another aspect of the invention for switching cells, having destination information therewith, between input ports and output ports, may include:

(a) a shared multibuffer having addresses for storing cells;

(b) a controller having a common address queue for queuing the addresses of cells stored in the shared multibuffer and the destination information.

In the Asynchronous Transfer Mode switch according to this invention, the address queue may include memory means for storing the addresses and the destination information of cells, and select means for selecting addresses for each of output ports based on the destination information.

In the Asynchronous Transfer Mode switch, the memory means may include shift memories for storing addresses and destination information, and searching elements for searching destination information stored in the shift memories.

In the Asynchronous Transfer Mode switch, each of the shift memories may include an occupation indicator for indicating an occupation status of the shift memory, and a shift trigger for shifting addresses and destination information to another shift memory based on the occupation status indicated by the occupation indicator in the other shift memory.

BRIEF DESCRIPTION OF THE DRAWINGS

In the drawings.

FIG. 2 is a timing chart which shows timing of the operation of each part shown in the block diagram of FIG. 1;

FIG. 3 is a timing chart which shows timing of the operation of each part shown in the block diagram of FIG. 1;

FIG. 4 is a timing chart which shows timing of the operation of each part shown in the block diagram of FIG. 1;

FIG. 7 is a timing chart which shows timing of the operation of each part shown in the block diagram of FIG. 6;

FIG. 8 is a timing chart which shows timing of the operation of each part shown in the block diagram of FIG. 6;

FIG. 9 is a timing chart which shows timing of the operation of each part shown in the block diagram of FIG. 6;

FIG. 14 is a priority table for controlling the priority according to the embodiment of this invention;

FIG. 15 is a count table for controlling the priority according to the embodiment of this invention;

FIG. 18 is a block diagram of the apparatus comprising smaller numbers of selectors according to another embodiment of this invention;

FIG. 19 shows the operation of the apparatus comprising smaller numbers of the selectors according to another embodiment of this invention;

FIG. 21 shows the operation of the apparatus comprising one detector and one selector according to another embodiment of this invention;

FIG. 27 shows a formula for calculating the memory size of the data queuing apparatus according to this invention and the conventional data queuing apparatus;

FIG. 28 shows the shift operation according to another embodiment of this invention;

FIG. 36 shows a formula for calculating the memory size needed by the conventional shared buffer memories (SBMs) and the address queues (AQs)

DESCRIPTION OF THE PREFERRED EMBODIMENTS

Embodiment 1.

Figure 1:
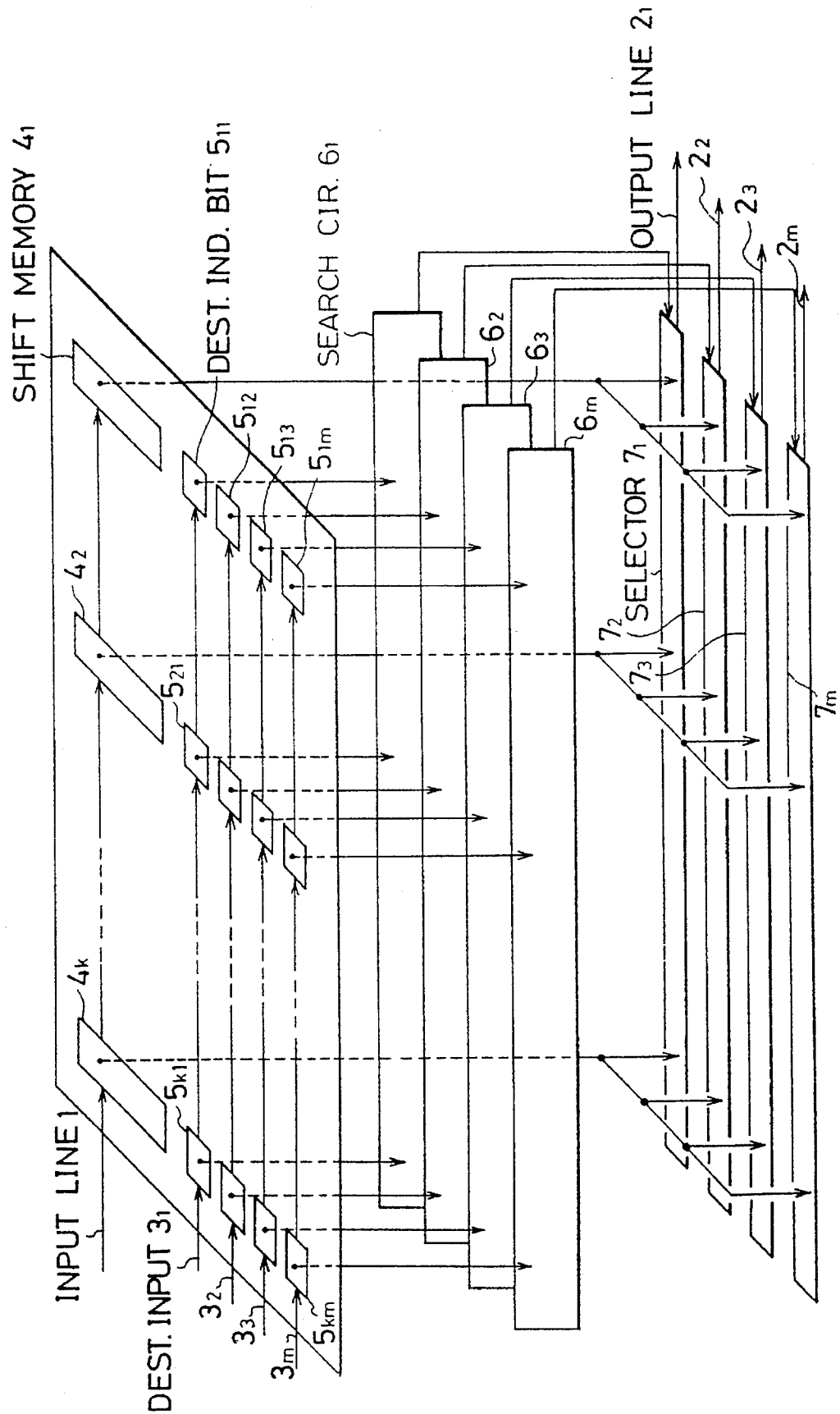
FIG. 1 is a block diagram of the data queuing apparatus according to an embodiment of this invention.
Figure 31:
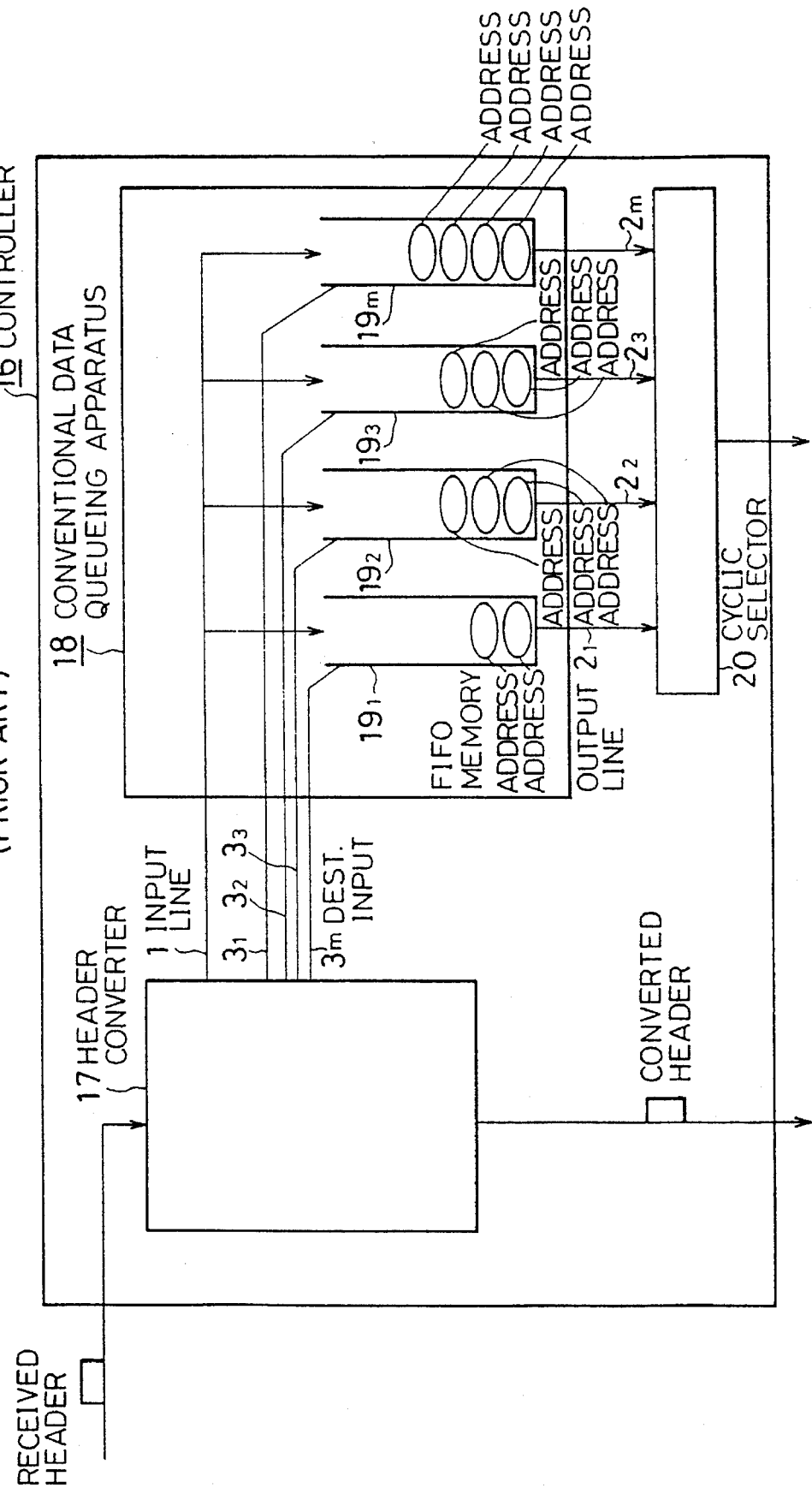
FIG. 31 is a block diagram of the conventional data queuing apparatus.
Figure 32:
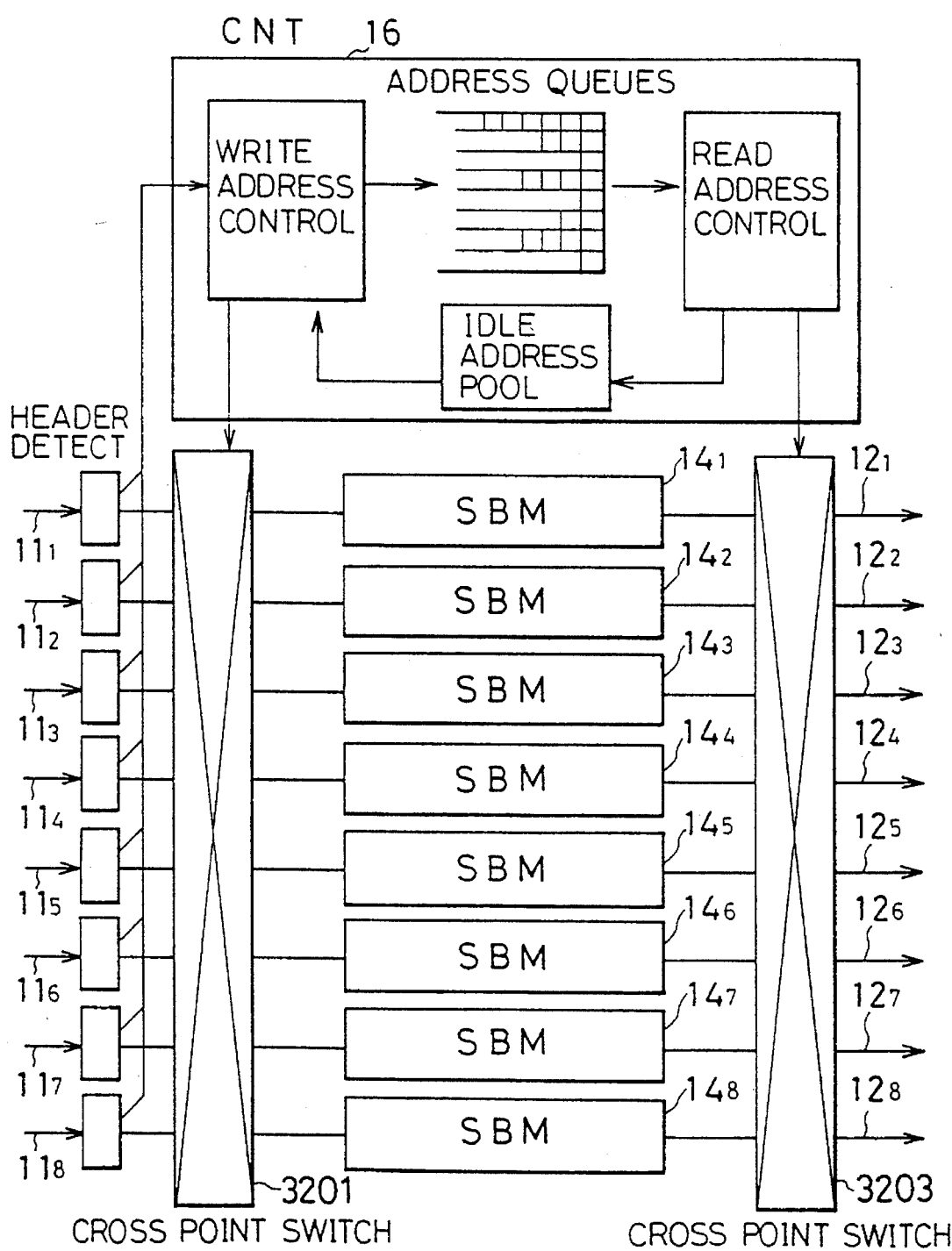
FIG. 32 shows a configuration of the shared multibuffer ATM switch.
Figure 33:
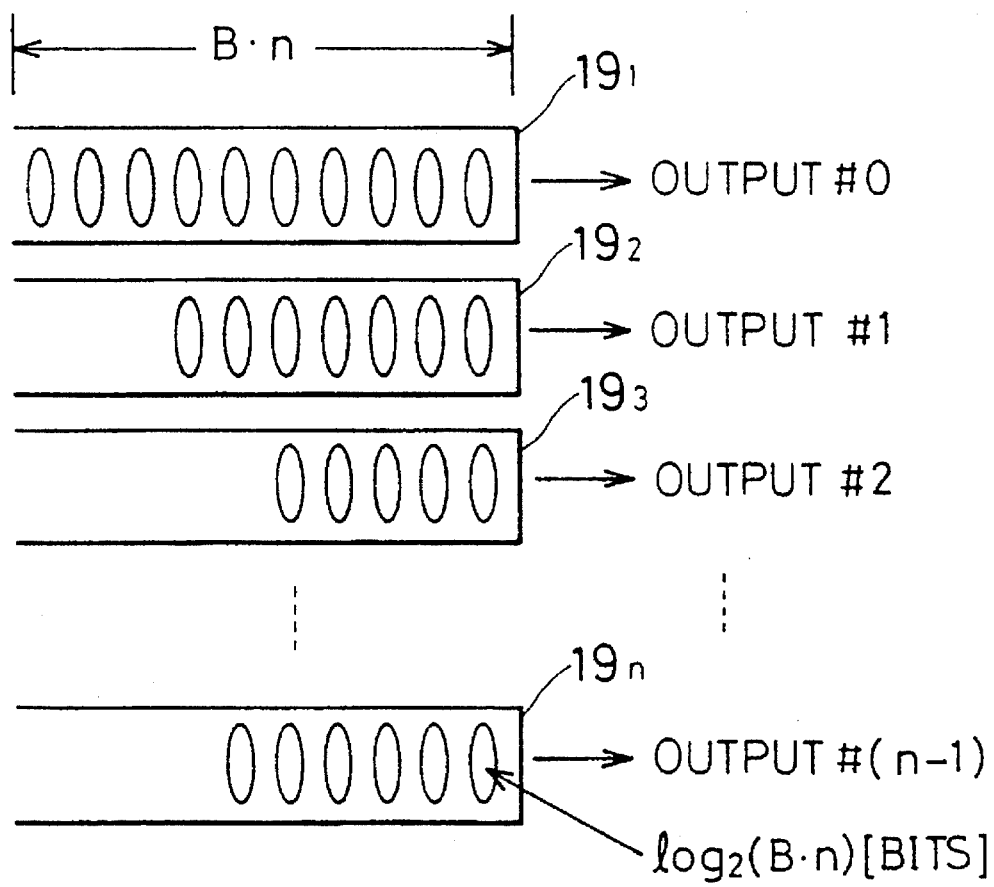
FIG. 33 shows the address queuing by the conventional FIFO memories.
Figure 34:
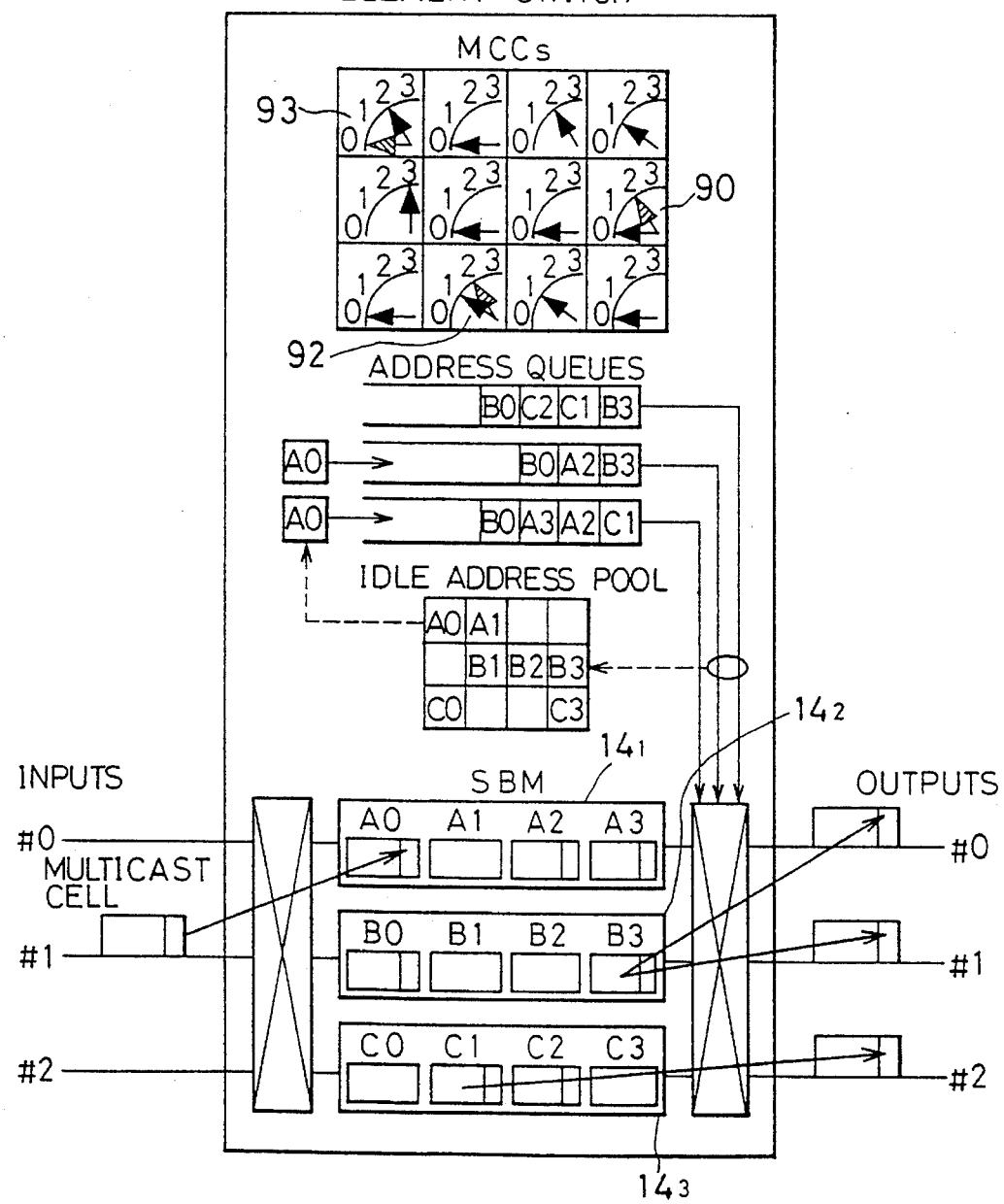
FIG. 34 shows the operation of the conventional data queuing apparatus, when receiving a conventional multicast cell.
Figure 35:
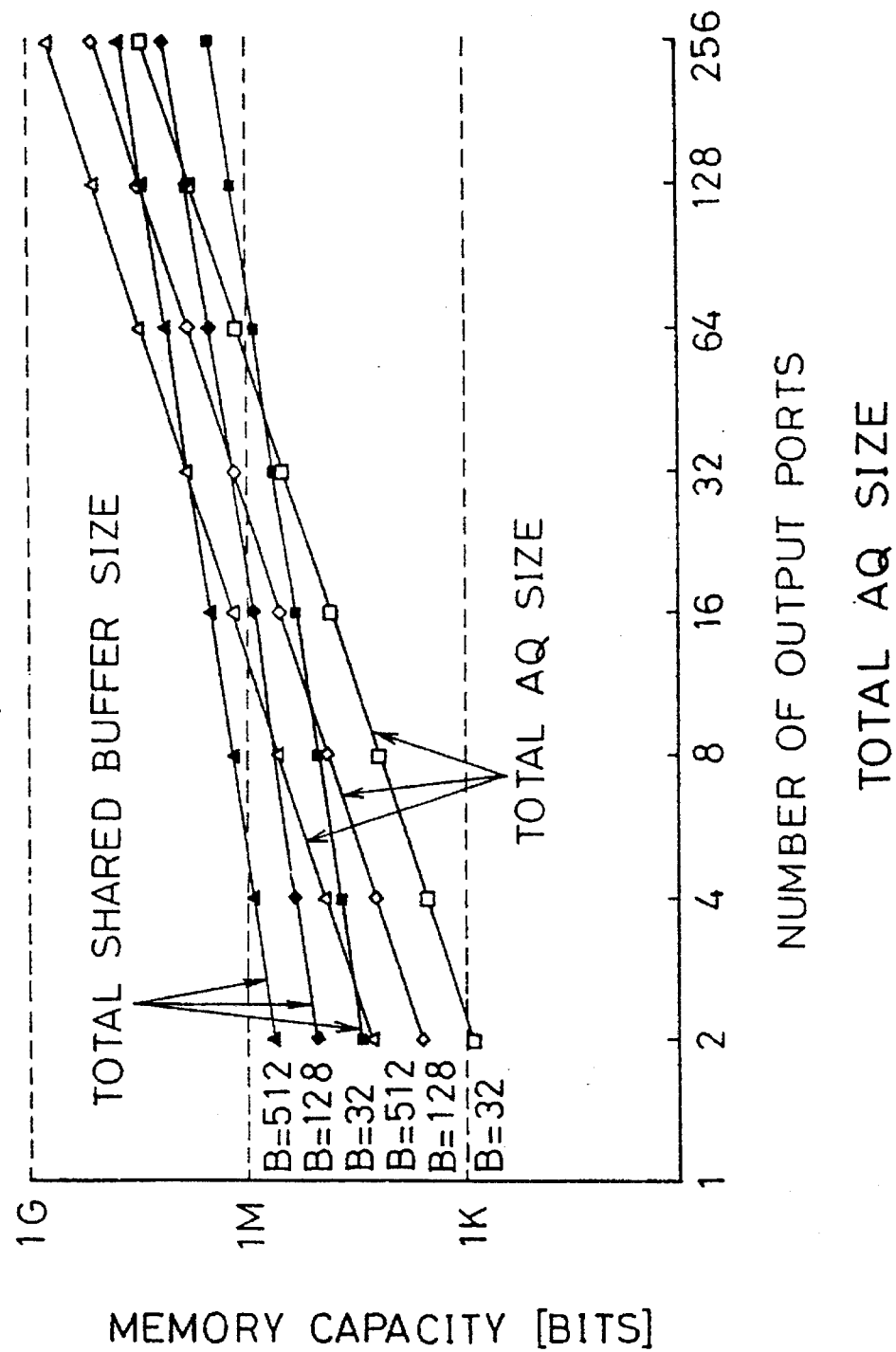
FIG. 35 shows the memory size needed by the conventional shared buffer memories (SBMs) and the address queues (AQs)
Figure 37:
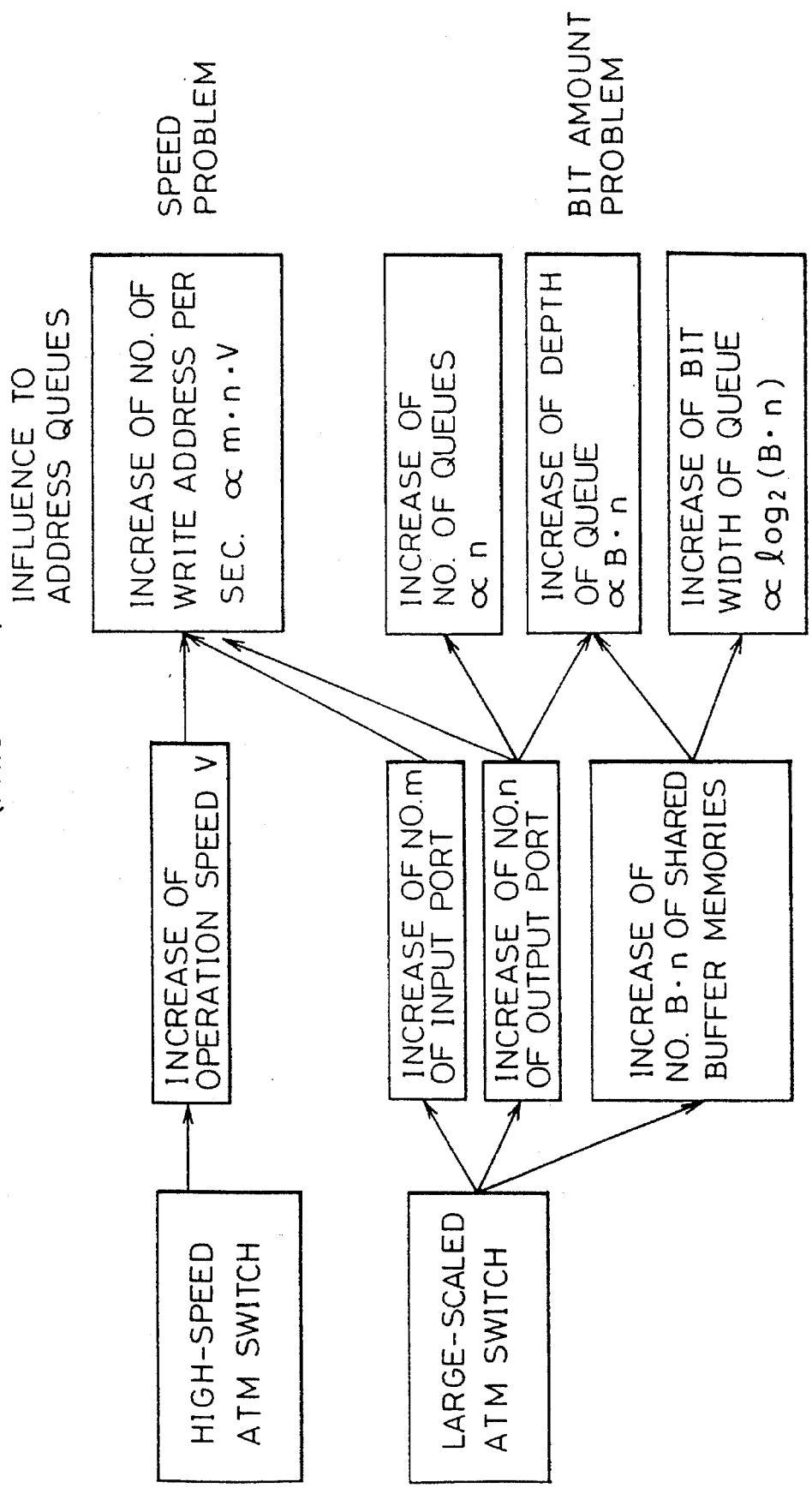
FIG. 37 shows design considerations related to high-speed ATM switches and large-scaled ATM switches.

The following is an explanation of a first embodiment, to be read while referring to the drawings. FIG. 1 shows an embodiment of a data queuing apparatus according to the invention. In the figure, the same reference designations as used in FIG. 31 are used for the same or similar parts.

In FIG. 1, an input line 1 receives a limited length of data and a plurality of output lines $2_1$–$2_m$ transmit data. Destination inputs $3_1$–$3_m$ are provided correspondingly to the output lines $2_1$–$2_m$ and indicate destination output ports of received data. Shift memories $4_1$–$4_k$ store data. Destination indicating bits $5_{11}$–$5_{km}$ are provided correspondingly to each shift memory. The destination indicating bit $5_{12}$, for example, shows whether the destination of the data stored in the shift memory $4_1$ is the output line $2_2$ or not. The destination indicating bit $5_{km}$, for another example, shows whether the destination of the data stored in the shift memory $4_k$ is the output line $2_m$ or not. Search circuits $6_1$–$6_m$ are provided correspondingly to each output lines $2_1$–$2_m$. The search circuit $6_1$, for example, is connected to the destination indicating bits $5_{11}$, $5_{21}$ ... $5_{kl}$. Selectors $7_1$–$7_m$ are provided correspondingly to each of the output lines $2_1$–$2_m$. The selector $7_1$, for example, corresponding to the output line $2_1$, selects the data to be transmitted from the shift memories $4_1$–$4_k$ based on a search result of the search circuit $6_1$, and transmits the data selected to the output line $2_1$.

Operation of the apparatus of FIG. 1 is explained hereinafter. FIGS. 2–4 show changing signals and memory contents when the number of the input line 1 is one, the number m of the output lines $2_1$–$2_m$ is four, the number k of the shift memories $4_1$–$4_k$ is six.

In FIGS. 2–4, line (a) shows time slots divided by a fixed length of time. Line (b) shows an example of data received in the input line 1, and line (c) shows destination inputs $3_4$, $3_3$, $3_2$, and $3_1$ in this order. Examples of the contents of the shift memories $4_1$–$4_6$ and the destination indicating bits $5_{11}$–$5_{64}$ in each time slot are shown in lines (d)–(o). Lines (p)–(s) show examples of the data to be transmitted to the output lines $2_1$–$2_4$.

Data received in the input line 1 is a limited length of information such as frame information divided into predetermined fixed times, fixed-length address information, or fixed-length packet information. In FIGS. 2–4, the predetermined fixed times are the time slots and a serial number is assigned to each time slot from time slot 1 for the convenience of this explanation. In these figures, one data item is received in each time slot.

These figures show an example in which no data was received before the time slot 1 or a long time has passed since data was last received, and therefore the shift memories $4_1$–$4_6$ are empty before time slot 1. One data item is received in each of the time slots 1, 2, 3, 4, 6, 7, and 8.

In FIGS. 2–4, the data to be transmitted to the output lines $2_1$–$2_4$ are read once every 4 time slots. Actually, data is read in the time slot 4 and the time slot 8.

Destination information is received at the destination inputs $3_1$–$3_4$ simultaneously with data received at the input line 1. For example, when the destination of the received data is the output line $2_4$, only the destination input $3_4$ is asserted. In the figures, "1" means an asserted bit, thus, in this case, destination inputs $\{3_4, 3_3, 3_2, 3_1\}$ become $\{1, 0, 0, 0\}$.

"Data a" addressed to the output line $2_4$ is received in the time slot 1, and "data b" addressed to the output line $2_1$ is received in the time slot 2. In the time slot 1, the shift memory $4_6$ is empty, thus, "data a" is shifted to the shift memory $4_6$ immediately. Destination inputs $3_1$–$3_4$ are stored in the destination indicating bits $5_{64}$-$5_{61}$.

In the same way, in the time slot 2, the shift memory $4_5$ is empty, thus, "data a" is shifted to the shift memory $4_5$, and "data b" is shifted to the shift memory $4_6$. When "data a" is shifted from the shift memory $4_6$ to the shift memory $4_5$, the destination in the destination indicating bits $5_{64}$-$5_{61}$ are shifted to the destination indicating bits $5_{54}$-$5_{51}$ corresponding to the next shift memory $4_5$.

The following is an explanation of reading out data to the output lines $2_1$–$2_4$. FIG. 2 shows an example of transmitting data in the time slot 4. At the first stage of the time slot 4, the search circuits $6_1$–$6_4$ search for and detect data to transmit. When any one of destination indicating bits $5_{11}$–$5_{64}$ is asserted, a search result to that effect is passed to the selectors $7_1$–$7_4$. The selectors $7_1$–$7_4$ select one transmitted data of those detected for each output line $2_1$–$2_4$ from the shift memories $4_1$–$4_6$, and transmit data to the output lines $2_1$–$2_4$.

For example, the search circuit $6_1$ detects data to transmit to the output line $2_1$. The destination indicating bits $5_{11}$, $5_{21}$, $5_{31}$, $5_{41}$, $5_{51}$, $5_{61}$ are read in this order until the asserted bit "1" is detected among these bits. If the asserted bit is detected, it is passed to the selector $7_1$. The selector $7_1$ shown in these figures selects one out of six. The selector $7_1$ selects one of 6 shift memories $4_1$–$4_6$, and the selected data is transmitted to the output line $2_1$.

The above operation of transmitting data to the output line $2_1$ is done independently of transmitting data to the other output lines $2_2$–$2_4$. These operations of transmitting data to the output lines can be done separately and simultaneously.

The destination indicating bits $5_{11}$–$5_{64}$ detected by the search circuits $6_1$–$6_4$ become deasserted after selection based on a detection. The data stored in the shift memories $4_1$–$4_6$ are deleted after reading. The next data is shifted to the shift memories $4_1$–$4_6$, if there is any data in the previous stage.

The following is a more detailed explanation of the operation, referring to FIGS. 2–4.

In each time slot 1–4, each of "data a, b, c, and d" is received. Each of "data a, b, c, and d" is stored in the shift memories in the order received.

In the time slot 4, one data is read and transmitted to each of the output lines $2_1$–$2_4$ as described above.

The data to be transmitted to the output line $2_1$ is explained referring to FIG. 2 hereinafter. In the time slot 4, the search circuit $6_1$ reads out the destination indicating bits $5_{11}, 5_{21}, 5_{31}, 5_{41}, 5_{51}$, and $5_{61}$ in this order. These bits are 0, 0, 0, 0, 1, and 1. The destination indicating bit $5_{51}$ is detected from these values, because it is asserted and read before $5_{61}$, and it is passed to the selector $7_1$. The selector $7_1$ selects the shift memory $4_5$ from six shift memories $4_1$–$4_6$ based on the result of the search circuit $6_1$ operation, and "data b" is transmitted to the output line $2_1$.

When "data b" is transmitted to the output line $2_1$, the shift memory $4_5$, in which "data b" was stored in the time slot 4, becomes empty. In the time slot 5, "data c", which was stored in the previous stage in the time slot 4, is shifted to the shift memory $4_5$ as shown in FIG. 3. And the destination information in the destination indicating bits $5_{64}, 5_{63}, 5_{62}$, and $5_{61}$ are also shifted to the destination indicating bits $5_{54}, 5_{53}, 5_{52}$, and $5_{51}$.

In the same way, "data a" is transmitted to the output line $2_4$.

Each value of the destination indicating bits $5_{12}, 5_{22}, 5_{32}, 5_{42}, 5_{52}$, and $5_{62}$, which correspond to the output line $2_2$, is 0, 0, 0, 0, 0, and 0. This means there exists no asserted bits, thus the search circuit $6_2$ informs the selector that there is no data to be transmitted. Thus, no data is transmitted from the output line $2_2$.

In the same way, no data is transmitted from the output line $2_3$.

No data is received in the time slot 5, however the data stored in the shift memories are shifted to the next shift memories. In the time slots 6–8, "data e, f, and g" are received sequentially. The received data are stored in the shift memories, and then shifted to the next shift memories.

In the time slot 8, data are read to be transmitted to the output lines as described above. In this case, "data c" is detected as the data to be transmitted to the output line $2_1$ by the search circuit $6_1$. "Data e" is detected as the data to be transmitted to the output line $2_2$ by the search circuit $6_2$. These detected "data c and e" are transmitted to each output lines. The search circuits $6_3$ and $6_4$ can know there are no data to be transmitted to the output lines $2_3$ and $2_4$ because the destination indicating bits have no asserted bits. Accordingly, no data is transmitted to the output lines $2_3$ and $2_4$.

In the time slots 9–11, no data is received at the input lines. In these cases, the data stored in the shift memories are shifted to the next shift memories sequentially.

"Data d" is stored in the shift memory $4_1$ in the time slot 10 as shown in FIG. 4. "Data d" cannot be shifted furthermore because the shift memory $4_1$ is the last stage. "Data d" remains in the shift memory $4_1$ during the time slot 11.

This "data d" is detected as the data to be transmitted to the output line $2_1$ by the search circuit $6_1$ in the time slot 12, then is transmitted to the output line $2_1$ by the selector $7_1$.

In the above examples, all received data could be written in the shift memory $4_6$. But data cannot be written when all of the shift memories $4_1$–$4_6$ are occupied by data. In this case, coming data are discarded. To reduce the possibility of data discard or loss, the number k of the shift memories $4_1$–$4_k$ is desired to be large.

Figure 5:
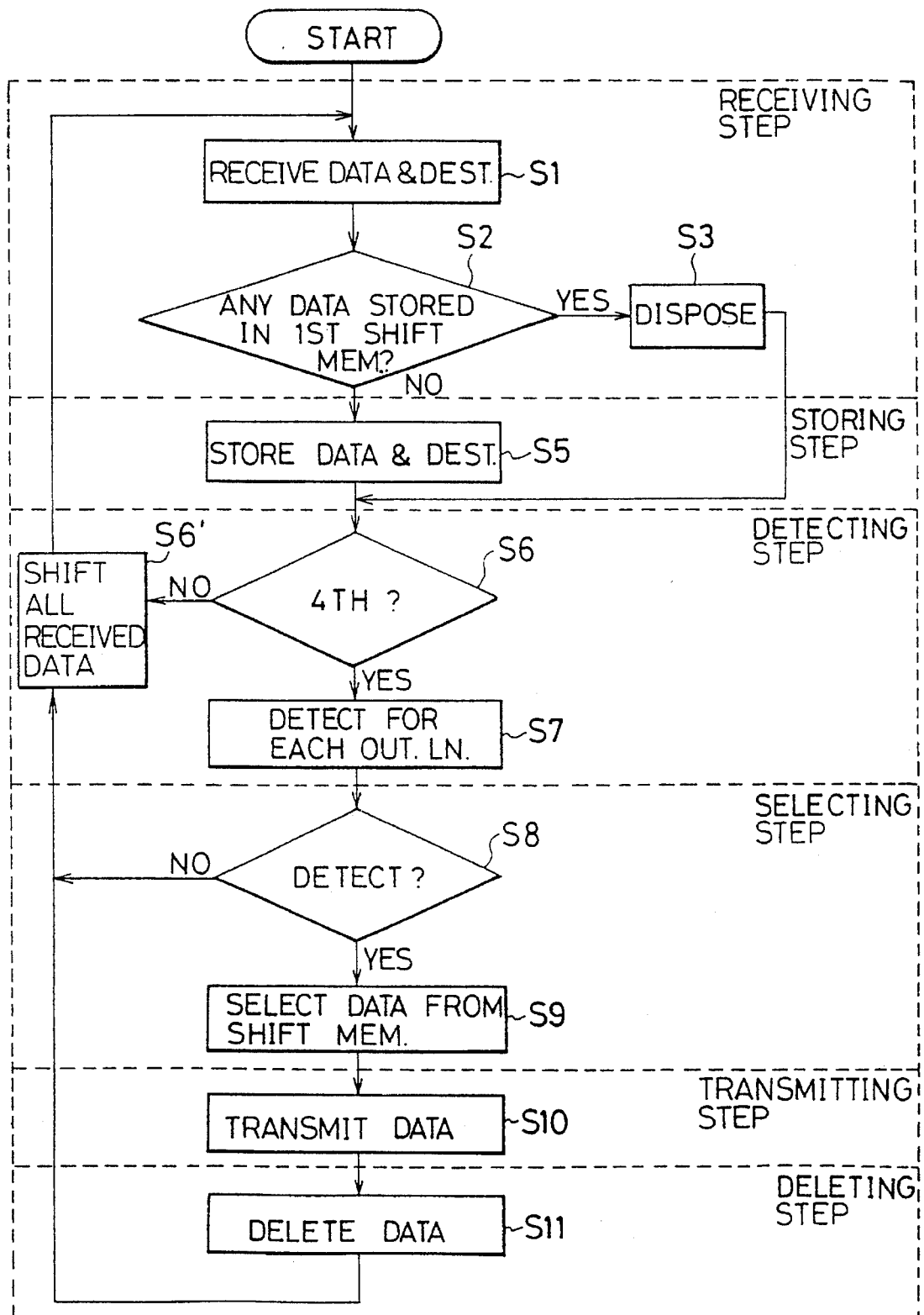
FIG. 5 is a flow chart of the operation according to the embodiment of this invention.

A flow of the above operation is explained hereinafter referring to FIG. 5.

At step S1, data and its destination are received at the input line 1 and the destination inputs $3_1$–$3_m$.

At step S2, it is checked whether the first shift memory, which initially stores the received data, is occupied by any data. When the first shift memory has been occupied by some other data, the data and the destination received at step S1, are disposed at step S3. If it is detected that the first shift memory is empty at step S2, the first shift memory stores at step S5, the data and the destination which are received at step S1.

At step S6, it is checked if it is fourth input or not. When it is not fourth input, the operation from step S1–S5 is repeated. While the operation from step S1–S6 is repeated, the received data are shifted at step S6', to the next shift memory one by one. By forward shifting as described above, the first shift memory, which receives the data for the first time, remains empty unless all shift memories are full.

If it is judged to be fourth input at step S6, the search circuits $6_1$–$6_4$ search and detect the data to be transmitted to each output lines by checking the destination to each output lines at step S7.

At step S8, it is checked if the data to be transmitted to the output line is detected or not. When no data is detected to be transmitted, the operation is repeated from the step S1 again. When any data is detected to be transmitted at step S8, the data is selected from the shift memory by the selector at step S9.

At step S10, the data selected by the selector is transmitted to the corresponding output line.

At step S11, the data is deleted from the shift memory by clearing the corresponding destination since the data transmitted at step S10 is no longer needed. After deleting the data, the operation is repeated from receiving data and the destination at step S1. And the data stored in the previous shift memory is requested to shift to the next stage by this data deletion. Thus, the data stored in the previous shift memory is overwritten in the shift memory where the destination has been cleared. (Step S6')

As described above, in this embodiment, received limited-length data in the input line 1 are written in the shift memories, in which data can be shifted from one to the next sequentially regardless of its destination. The destination indicating bits are associated with each of the shift memories. The search circuits search the data to be transmitted in received order by detecting an asserted bit from the destination indicating bits corresponding to the destination output lines, and the data is extracted by the selectors. After extraction, the selector transfers the data to the desired output lines and the previous data is shifted to overwrite the transmitted data.

By this embodiment, the data received at the input line is written in the shift memories and its destination is stored in the destination indicating bits. Data are read in arrival order by searching the destination indicating bits corresponding to each of the output lines, so that the received data can be transmitted to the desired output line in arrival order. The shift memories can be used commonly for all output lines, so that the data queuing apparatus can reduce the possibility of data loss, which would be caused by attempting to write data, especially receiving bursty data which exceed the capacity of the shift memories.

Embodiment 2.

Figure 6:
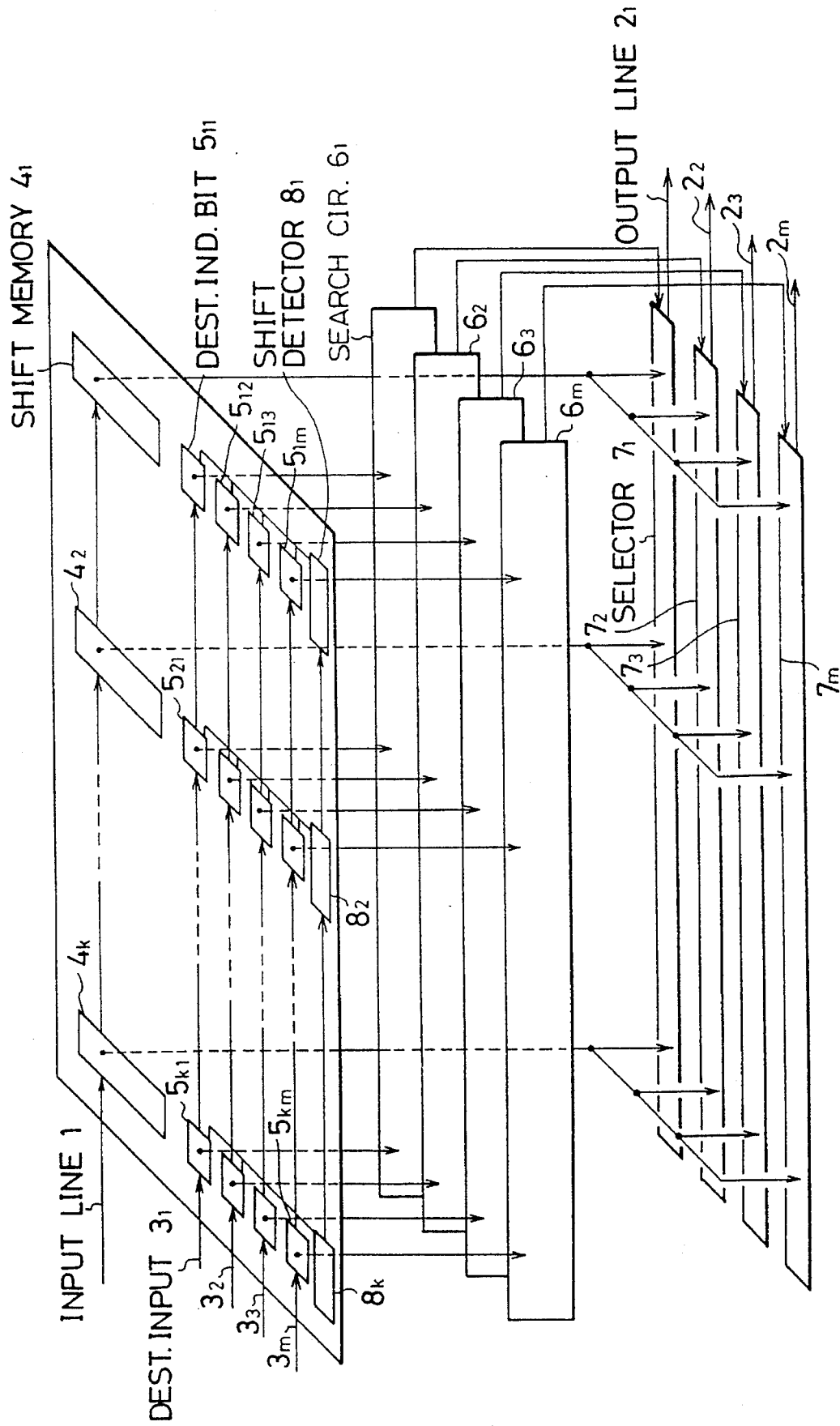
FIG. 6 is a block diagram of the data queuing apparatus according to another embodiment of this invention.

The following is an explanation of another embodiment of this invention referring to the drawings. FIG. 6 shows another embodiment of the data queuing apparatus according to this invention. The same reference designations are used for the same or similar elements as in Embodiment 1 and are not explained here, for clarity sake.

In FIG. 6, shift detectors $8_1$–$8_k$ are provided correspondingly to each shift memories $4_1$–$4_k$. The shift detectors trigger shifting of data stored in the previous shift memories $4_1$–$4_k$ when they detect the case that none of m number of destination indicating bits are asserted. For example, when the shift detector $8_2$, provided correspondingly to the shift memory $4_2$, detects that none of destination indicating bits $5_{21}, 5_{22} \ldots 5_{2m}$ are asserted, it shifts data stored in the previous shift memory $4_3$.

Operation of this embodiment is explained hereinafter. FIGS. 7–9 are charts which show each signal and changing status of each element. In this case, the number of the input lines 1 is one, the number m of output lines $2_1$–$2_m$ is four, and the number k of shift memories $4_1$–$4_k$ is six.

In FIGS. 7–9, line (a) shows time slots, line (b) shows an example of data received at the input line 1, and line (c) shows each of the destination inputs $3_4, 3_3, 3_2,$ and $3_1$ for indicating the destination of the received data in this order. Lines (d)–(u) show examples of the status of the shift memories $4_1$–$4_6$ and the destination indicating bits $5_{11}$–$5_{64}$ in each time slot. And lines (v)–(y) show the data to be transmitted to each of the output lines $2_1$–$2_4$.

The data received at the input line 1 is limited-length information such as frame information divided by a predefined fixed time, fixed length address information, or fixed length packet. In FIGS. 7–9, the fixed-length time is defined as a time slot. As shown in line (a), a serial number is assigned sequentially from time slot 1 for purposes of this explanation. In these figures, one data item is received in one time slot.

These figures show an example in which no data was received before the time slot 1 or a long time has passed since the last data was received, and the shift memories $4_1$–$4_6$ therefore store no data just prior to the time slot 1. One data item is received in each of the time slots 1, 2, 3, 4, 6, 7, 8, 9, and 11.

In FIGS. 7–9, the data to be transmitted to the output lines $2_1$–$2_4$ are read out once every 4 time slots. Actually, data is read out in the time slot 4, in the time slot 8 and the time slot 12.

Destination information is received at the destination inputs $3_1$–$3_4$ simultaneously with data received at the input line 1. For example, when the destination of the received "data h" is the output line $2_4$, the destination input $3_4$ becomes asserted. In the figures, "1" means an asserted bit, thus, in this case, the destination inputs $\{3_4, 3_3, 3_2, 3_1\}$ become $\{1, 0, 0, 0\}$.

When the received data is destined for a plurality of output lines, that is, multicast data, a plurality of bits of the destination inputs $3_1$–$3_4$ become asserted. For example, "data a" received in the time slot 1 is addressed to the output lines $2_1$ and $2_4$, thus the destination inputs $3_1$ and $3_4$ become asserted. In other words, the destination inputs $\{3_4, 3_3, 3_2, 3_1\}$ become $\{1, 0, 0, 1\}$.

In the time slot 1, "data a" addressed to the output lines $2_1$ and $2_4$ is received, and "data b" addressed to the output line $2_2$ is received in the time slot 2. In the time slot 1, the shift memory $4_6$ is empty. "Data a" is therefore shifted to the shift memory $4_6$ immediately. The destination inputs $3_1$–$3_4$ are stored in the destination indicating bits $5_{64}$–$5_{61}$.

In the same way, in the time slot 2, the shift memory $4_5$ is empty. Therefore, "data a" is shifted to the shift memory $4_5$, and "data b" is shifted to the shift memory $4_6$. With shifting "data a" from the shift memory $4_6$ to $4_5$, the destination in the destination indicating bits $5_{64}$–$5_{61}$ are simultaneously shifted to the destination indicating bits $5_{54}$–$5_{51}$, which are provided correspondingly to the next shift memory $4_5$.

The shift detectors $8_1$–$8_6$ are provided correspondingly to the shift memories $4_1$–$4_6$. In the time slot 1, they detect the case that none of m number of the destination indication among the destination indicating bits $5_{11}$–$5_{64}$ is asserted. For example, in the figures, as a status value of the shift detector, "1" is defined as meaning that at least one of the destination indicating bits is asserted, and "0" is defined that there is no asserted bit among the corresponding destination indicating bits. Given this definition, OR gates can be used for the shift detectors $8_1$–$8_6$.

For example, all of the destination indicating bits $5_{61}$–$5_{64}$ corresponding to the shift memory $4_6$ are "0" in the time slot 1, thus the status of the shift detector $8_6$ becomes "0". In the time slot 2, one of the destination indicating bits $5_{61}$–$5_{64}$ corresponding to the shift memory $4_6$ is "1", thus the status of the shift detector $8_6$ becomes "1".

The following is an explanation of reading out data to be transmitted to the output lines $2_1$–$2_4$.

FIG. 7 shows an example of transmitting data in the time slot 4. At a first stage of the time slot 4, the search circuits $6_1$–$6_4$ search for and detect data to be transmitted. When any one of the destination indicating bits $5_{11}$–$5_{64}$ is asserted, it is communicated to the corresponding selectors $7_1$–$7_4$. The selectors $7_1$–$7_4$ select one from the shift memories $4_1$–$4_6$, and transfer data to the output lines $2_1$–$2_4$.

For example, the search circuit $6_1$ detects data to be transmitted to the output line $2_1$. The destination indicating bits $5_{11}$, $5_{21}$, $5_{31}$, $5_{41}$, $5_{51}$, $5_{61}$ are read in this order until the asserted bit "1" is detected among these bits. If the asserted bit is detected, it is communicated to the selector $7_1$. The selector $7_1$ in the figure is a selector which selects one from six. The selector $7_1$ selects one from six shift memories $4_1$–$4_6$, and the selected data is transferred to the output line $2_1$.

An operation of transmitting data to the output line $2_1$ is carried out independently of transmitting data to the other output lines $2_2$–$2_4$. These operations can be done separately and simultaneously.

The destination indicating bits $5_{11}$–$5_{64}$ detected by the search circuits $6_1$–$6_4$ are updated and become deasserted after selection of the corresponding data for transmit based on a detection. Then, each of the shift detectors $8_1$–$8_6$ detect the possibility of shifting data to each of the corresponding shift memories $4_1$–$4_6$ based on the updated destination indicating bits $5_{11}$–$5_{64}$. When it is noticed to be possible to shift data and the previous shift memory is occupied by data, the data is shifted to the corresponding shift memory.

The data to be transmitted to the output line $2_j$ is explained referring to the figures hereinafter. In the time slot 4, the search circuit $6_1$ reads out the destination indicating bits $5_{11}$, $5_{21}$, $5_{31}$, $5_{41}$, $5_{51}$, and $5_{61}$ in this order. Each value of these bits is 0, 0, 0, 1, 0, and 1. The asserted destination indicating bit $5_{41}$ is detected from these values, and it is communicated to the selector $7_1$. The selector $7_1$ selects the shift memory $4_4$ from six shift memories $4_1$–$4_6$ based on the detection by the search circuit $6_1$, and "data a" is transmitted to the output line $2_1$.

After "data a" is transferred to the output line $2_1$, the corresponding destination indicating bit $5_{41}$ is cleared or deasserted.

In the same way, the search circuit 64 detects "data a" stored in the shift memory $4_4$ as the data to be transferred to the output line $2_4$ in the time slot 4. After "data a" is transferred to the output line $2_4$, the corresponding destination indicating bit $5_{44}$ is cleared or deasserted.

In the time slot 4, the destination indicating bits $\{5_{44}, 5_{43}, 5_{42}, 5_{41}\}$ corresponding to the shift memory $4_4$, which stored "data a", change value from $\{1, 0, 0, 1\}$ to $\{0, 0, 0, 0\}$. The shift detector $8_4$ also changes status value from "1" to "0" at the same time.

When the shift detector $8_4$ changes the status value from "1" to "0", that means "data a" is transmitted to all of the desired destinations, that is, the output lines $2_1$ and $2_4$. Then, "data a" is deleted.

In the same way, "data b" in the shift memory $4_5$ is transmitted to the output line $2_2$ in the time slot 4. "Data c" stored in the previous shift memory $4_6$ is shifted to the shift memory $4_5$ in the time slot 5. And each of the destination indicating bits $5_{64}$, $5_{63}$, $5_{62}$, and $5_{61}$ is also shifted to each of the destination indicating bits $5_{54}$, $5_{53}$, $5_{52}$, and $5_{51}$ with shifting "data c" simultaneously.

Each of the destination indicating bits $5_{13}$, $5_{23}$, $5_{33}$, $5_{43}$, $5_{53}$, and $5_{63}$, which correspond to the output line $2_3$, is 0, 0, 0, 0, 0, and 0. This means there exists no asserted bits, thus the search circuit $6_2$ communicates the selector that there is no data to transmit. No data is transmitted from the output line $2_3$.

In the time slot 5, no data is received. "Data e, f, and g" are received in the time slots 6–8.

In the time slot 8, the search circuit detects the data to transmit. In this case, "data c" is to be transmitted to the output line $2_1$. "Data d" is to be transmitted to the output line $2_2$. Though "data d" is multicast data addressed to the output lines $2_1$ and $2_2$, "data c" is already chosen to be transmitted to the output line $2_1$. Thus, "data d" is transmitted only to the output line $2_2$. "Data e" is multicast data addressed to all output lines. But each of "data c and d" is already detected as the data to be transmitted to each of the output lines $2_1$ and $2_2$ in this case. "Data e" is thus transmitted to the output lines $2_3$ and $2_4$.

As a result, all of the destination indicating bits of "data c" become "0" and the shift detector changes the status value from "1" to "0". On the other hand, some of the destination indicating bits of "data d" and "data e" are still asserted, so that the status value of the shift detectors remain "1".

In the time slot 9, "data h" is received and no data is received in the time slot 10.

"Data d", stored in the shift memory $4_1$ in the time slot 10, cannot be shifted further because the shift memory $4_1$ is the last stage, so that "data d" remains in the shift memory $4_1$ in the time slot 11.

This "data d" is transmitted to the output line $2_1$ in the time slot 12. After "data d" is transmitted to the output line $2_1$, no destination indicating bits are asserted, so that the shift detector changes the status value from "1" to "0". Thus, "data d" is deleted.

In the above examples, all received data can be written in the shift memory $4_6$. But received data cannot be written when all of the shift memories $4_1$–$4_6$ are occupied by data. In this case, coming data are discarded. To reduce the possibility of data discard or loss, the number k of the shift memories $4_1$–$4_k$ is desired to be large.

As described above, in this embodiment, if multicast data addressed to a plurality of the output lines is received, the data can be shifted from one shift memory to the next, in accordance with whether the shift detectors detect that the data is transmitted to all desired output lines indicated by the destination indicating bits. The received data can be transmitted to the desired output line in the received order. The shift memories are each common to all output lines, so that the data queuing apparatus can reduce the possibility of data loss, which would be caused by attempting to write data, especially receiving bursty data which exceed the capacity of the shift memories.

In this embodiment, the multicast data can be stored in the shift memories until the data is transmitted to all desired output lines, so that multicast processing can be done even if the shift memories are used commonly by all output lines.

Embodiment 3.

In the above embodiments 1 and 2, the number of input lines is one. The data queuing apparatus can be also configured for writing a plurality of data in parallel from a plurality of input lines $1a$, $1b$ and $1c$.

Figure 10A:
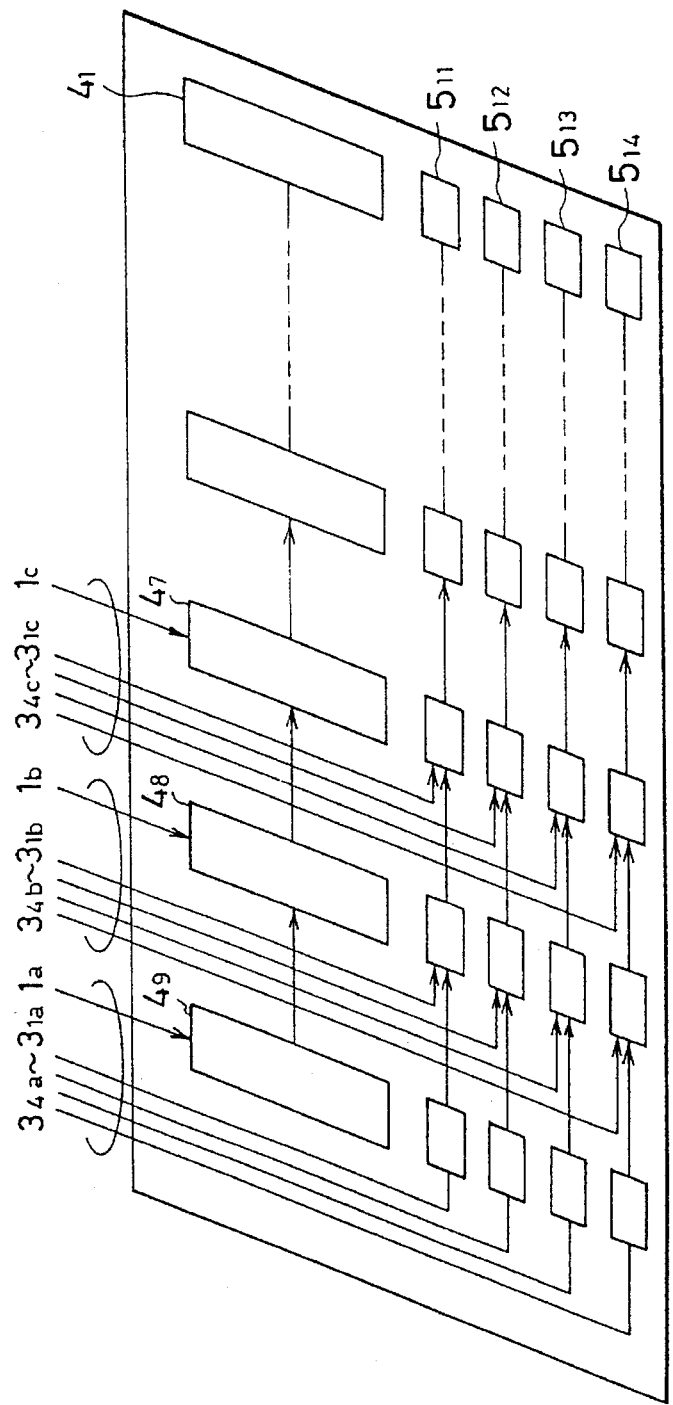
FIGS. 10(a) and 10(b) are part of a block diagram of the data queuing apparatus according to another embodiment of this invention.
Figure 10B:
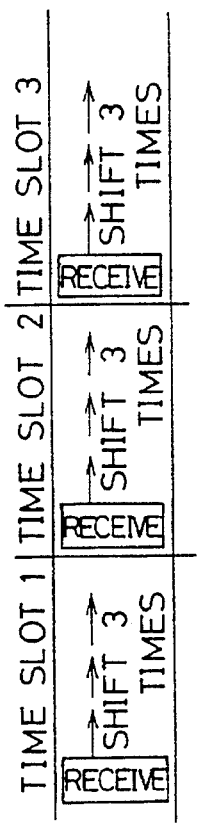

In FIG. 10($a$), shows an example of this embodiment. In the figure, the shift memories $4_1$–$4_9$ are provided. The data is received at each of the input lines $1a$, $1b$, and $1c$ to each of the shift memories $4_7$, $4_8$, and $4_9$. In the same way, each of the destination inputs is stored in each of the destination indicating bits. In this example, the number of input lines is three and therefore three received data can be written in the shift memories in parallel simultaneously. In this configuration, three shift memories store received data simultaneously as shown in FIG. 10($b$), therefore the apparatus shifts the data three times in one time slot. Namely, the apparatus is configured to receive data and to shift data three times in one time slot. In this embodiment, though the shift memory has to shift the data more quickly than Embodiments 1 and 2, the data can be received in the plurality of input lines to be processed simultaneously, so that a large amount of data can be processed at a high speed.

Embodiment 4.

In the above Embodiments 1 and 2, the search circuits are provided correspondingly to the output lines and the search circuits operate independently and simultaneously. But a data queuing apparatus can be also configured with fewer search circuits, each of which corresponds to a plurality of output lines. The search circuits operate at a high speed and each search circuit detects the data stored in the plurality of shift memories, so that the scale of the hardware can be reduced.

Figure 11:
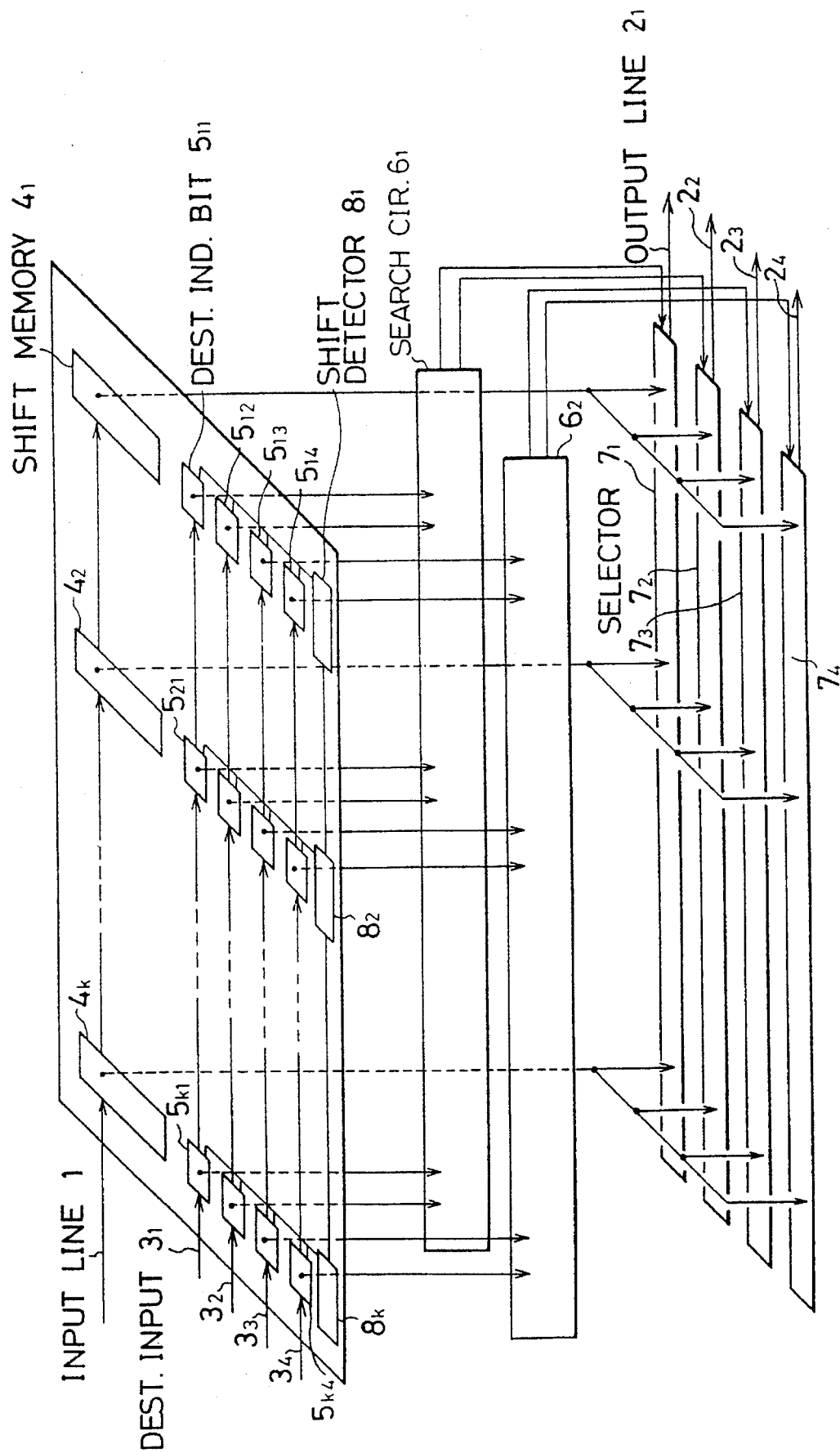
FIG. 11 is a block diagram of the data queuing apparatus according to another embodiment of this invention.

FIG. 11 shows an example of this embodiment. In the figure, the search circuit $6_1$ is provided correspondingly to the output lines $2_1$ and $2_2$, and the search circuit $6_2$ is provided correspondingly to the output lines $2_3$ and $2_4$. Namely, one search circuit is provided correspondingly to two output lines. The search circuits $6_1$ and $6_2$ operate at more than two times the speed of the search circuits in Embodiments 1 and 2, so that the same effect can be attained as in Embodiments 1 and 2.

Another case where only one search circuit is provided is possible (not shown in a figure). In this case, one search circuit is provided for the output lines $2_1$–$2_4$, so that the search circuit needs to operate at more than four times the speed of the search circuits in Embodiments 1 and 2. The search circuit can be common in this case, and therefore the apparatus scale can be reduced.

Embodiment 5.

In Embodiments 1 and 2, the shift memories shift the data one by one in one time slot, but it is desirable that the shifting speed is higher. The apparatus of this embodiment is configured as the same as in Embodiments 1 and 2, however, it shifts data asynchronous with the time slot. That is, the interval of shiftings is shorter than the period of the time slot. The speed of shifting data is increased, and data can be shifted forward more quickly. Thus, the received data is stored certainly in the shift memory.

Embodiment 6.

In the above embodiments, the data is read once every four time slots, but in another case, for example, the data can be read once every time slot. This reading-out frequency can be vary.

Embodiment 7.

In the above embodiments, the speed of the input lines is the same as the speed of the output lines. However, a higher traffic concentration can be achieved by reading the data from the shift memory at a higher speed. It is also possible that the data can be written from the input line at a higher speed than it is read out at the output lines.

Embodiment 8.

In the above embodiments, a set of the destination indicating bits and a search circuit are provided correspondingly to each of the output lines of the data queuing apparatus. A plurality of the above sets of the destination indicating bits and search circuits may be provided correspondingly to each of the delay priorities. The data having higher delay priority can be read first based on a code, which indicates the delay priority.

Figure 12:
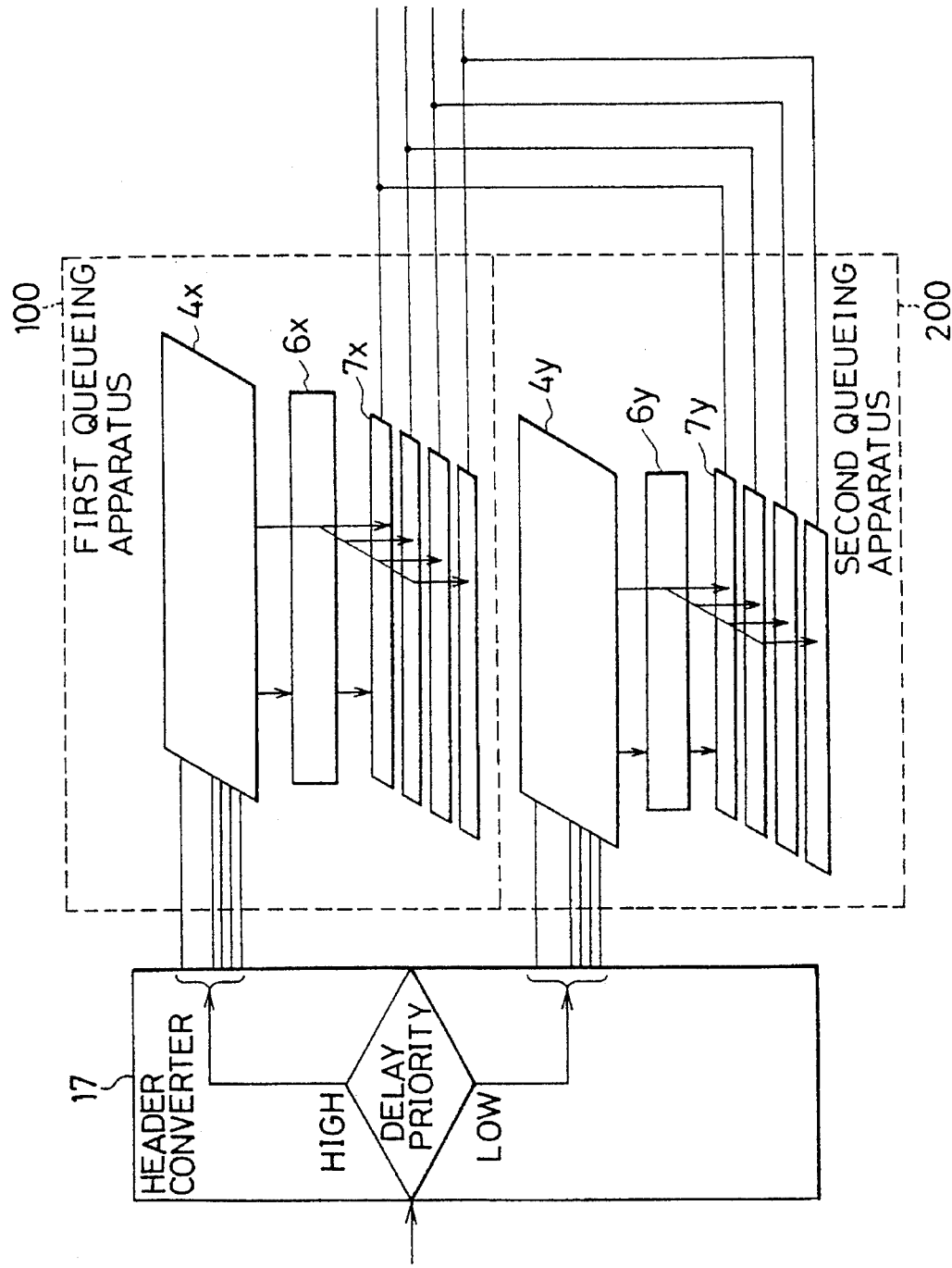
FIG. 12 is a block diagram of a configuration having a plurality of the data queuing apparatuses according to another embodiment of this invention.

FIG. 12 shows an example of this embodiment. In the figure, a header converter 17, a first queuing apparatus 100, and a second queuing apparatus 200 are provided. In FIG. 12, two sets of the data queuing apparatuses are provided for one output line. The header converter 17 detects the delay priority included in the header of the received data. The data are distributed to the first queuing apparatus or the second queuing apparatus based on the delay priority. The first queuing apparatus is configured to have higher priority than the second queuing apparatus. For example, the first queuing apparatus may read the data once every four time slots and the second queuing apparatus may read the data once every eight time slots. By making such a difference between two queuing apparatuses, the priority of the first queuing apparatus becomes higher than the second queuing apparatus. Higher priority of the first queuing apparatus can also be got by reading the data in the second queuing apparatus after all data in the first queuing apparatus have been read.

Embodiment 9.

Figure 13:
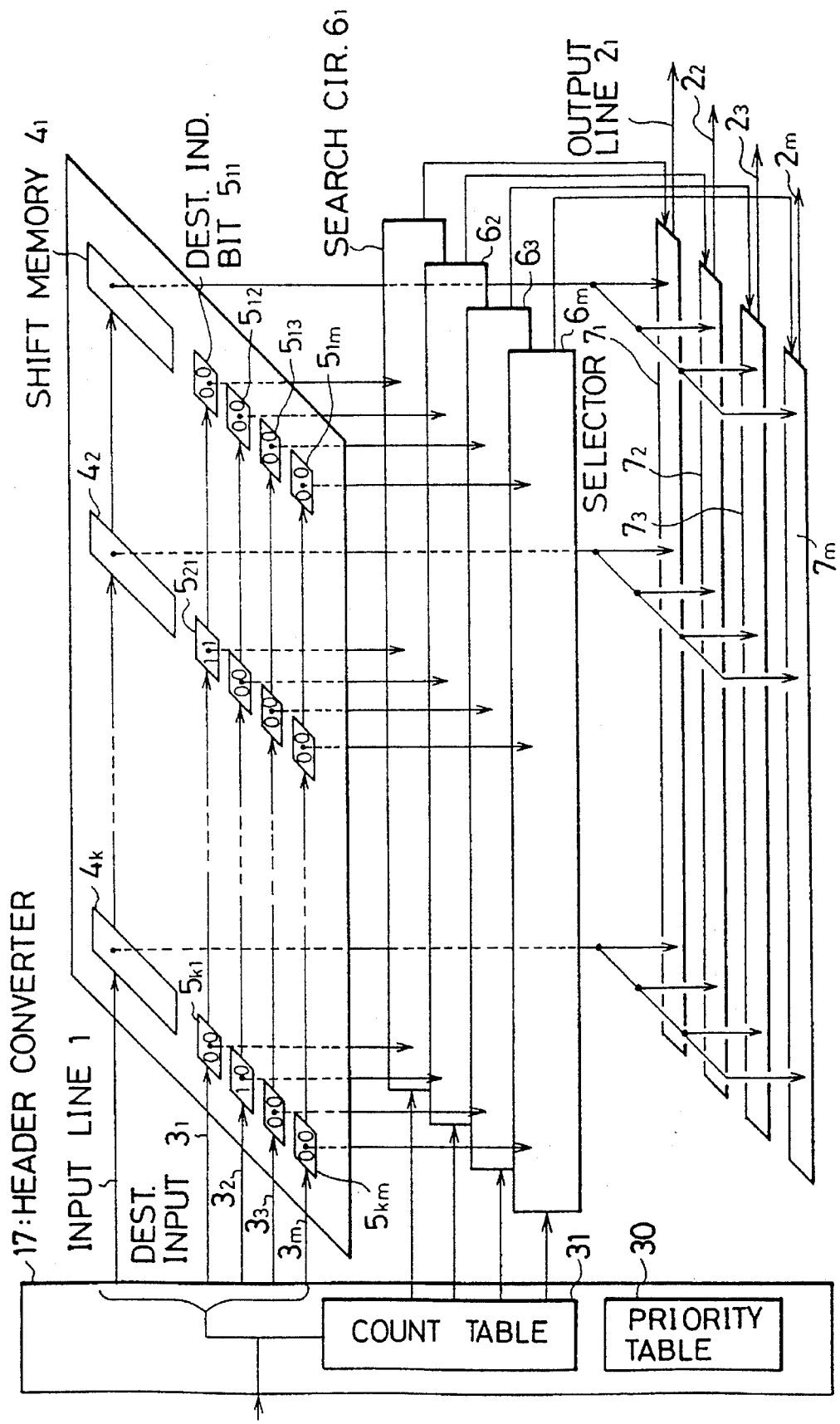
FIG. 13 is a block diagram of the data queuing apparatus controlling the priority according to another embodiment of this invention.

FIG. 13 shows another embodiment of this invention using priority. In this embodiment, priority can be controlled by indicating the destination with two bits instead of one bit. A priority table 30 and a count table 31 are included in the header converter 17 as shown in FIG. 13.

The priority table is a table showing a priority corresponding to two bits as shown in FIG. 14. The count table is a table for counting how many data items with different priorities are stored in the shift memories corresponding to each output lines, as shown in FIG. 15.

The header converter 17 receives the data having one of "high", "middle", "low" priorities and transmits it to the shift memory. The header converter 17 sets the value for each of destination indicating bits corresponding to the received priority. When the value of the bits is "00", no data exists. In other cases, the value of the bit is set correspondingly to each priority. The header converter 17 sets the priority with reference to the priority table 30.

The header converter 17 also increments the corresponding value of the count table 31 when the data and the destination indication is transmitted to the first shift memory. The count table shows how many data items, having each of priorities, exist for each of the output lines. The search circuit searches for and detects the data to be transferred to each of the output lines in an order of priority with reference to this count table. For example, the search circuit $6_1$ is informed that one data having "high" priority and one data having "middle" priority exist by the count table 31 as shown in FIG. 15. The search circuit detects the data having "high" priority and requests to the selector to select and transfer it first. For example, in FIG. 13, the data having "high" priority is stored in the shift memory $4_2$, so that the selector $7_1$ selects and transfers the data stored in the shift memory $4_2$ earlier than the data having "middle" priority stored in the shift memory $4_1$ to the output line $2_1$.

In this way, priority control can be processed by using plural bits in the destination indicating bits which show the priority of the data.

Embodiment 10.

Furthermore, in the above embodiment, the data can be processed as a parallel signal by providing a serial-parallel converter and/or a parallel-serial converter in the pre-stage and/or the post-stage of the data queuing apparatus, if the operation speed is limited in the data queuing apparatus.

Figure 16:
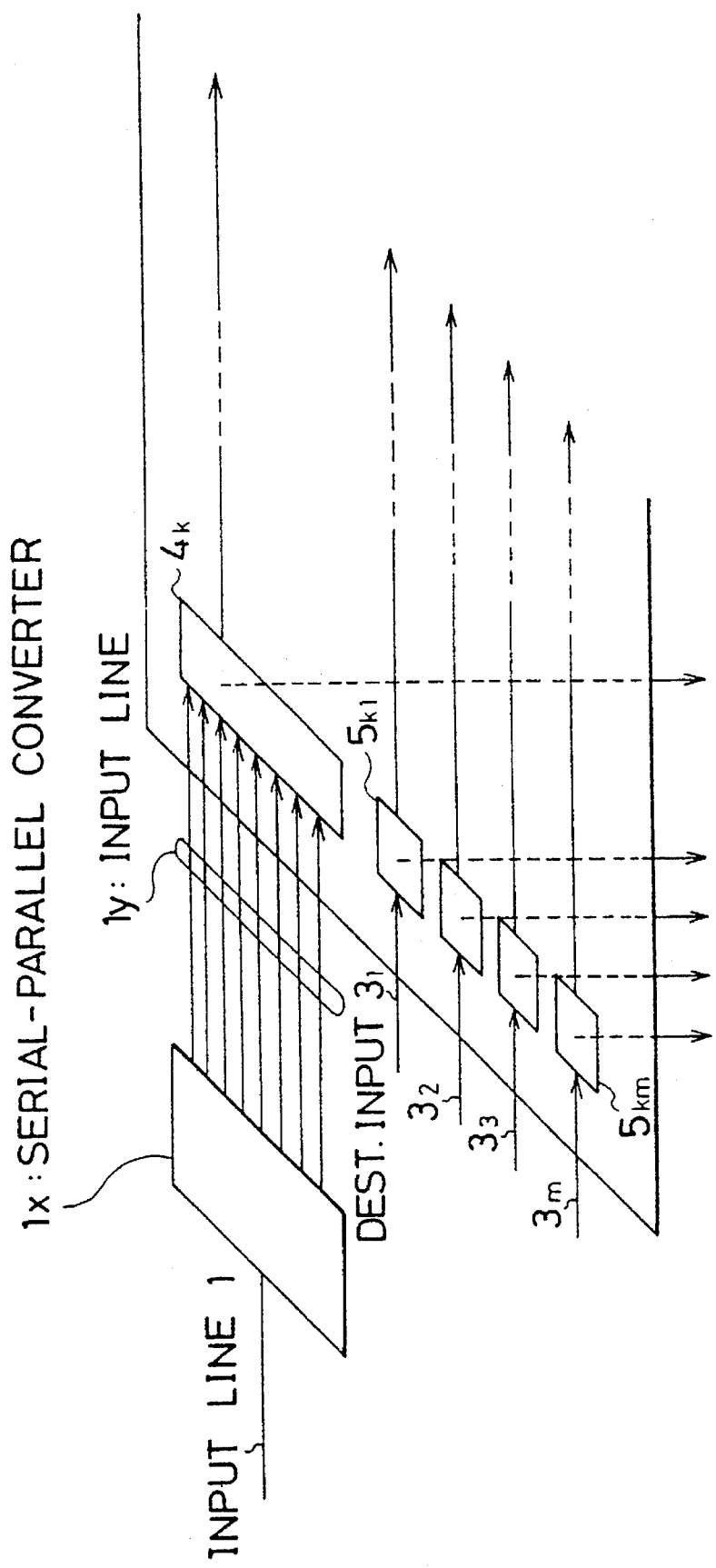
FIG. 16 is a block diagram of the serial-parallel converter according to another embodiment of this invention.

FIG. 16 shows this embodiment. In this case, the number of the input lines $1_y$ is eight. In this embodiment, the shift memory is configured to have eight bits and the input lines are provided correspondingly to each of bits, so that eight bits can be written in the shift memories in parallel. In this way, data transfer at a higher speed can be achieved by providing a plurality of the input lines compared with the case of one input line.

Embodiment 11.

In the above Embodiments 1 and 2, the limited-length data is received. The data can be address information in the packet switch, or the packet itself. Also other kinds of data can be processed with the apparatus described in the above Embodiments 1 and 2.

Embodiment 12.

Figure 17:
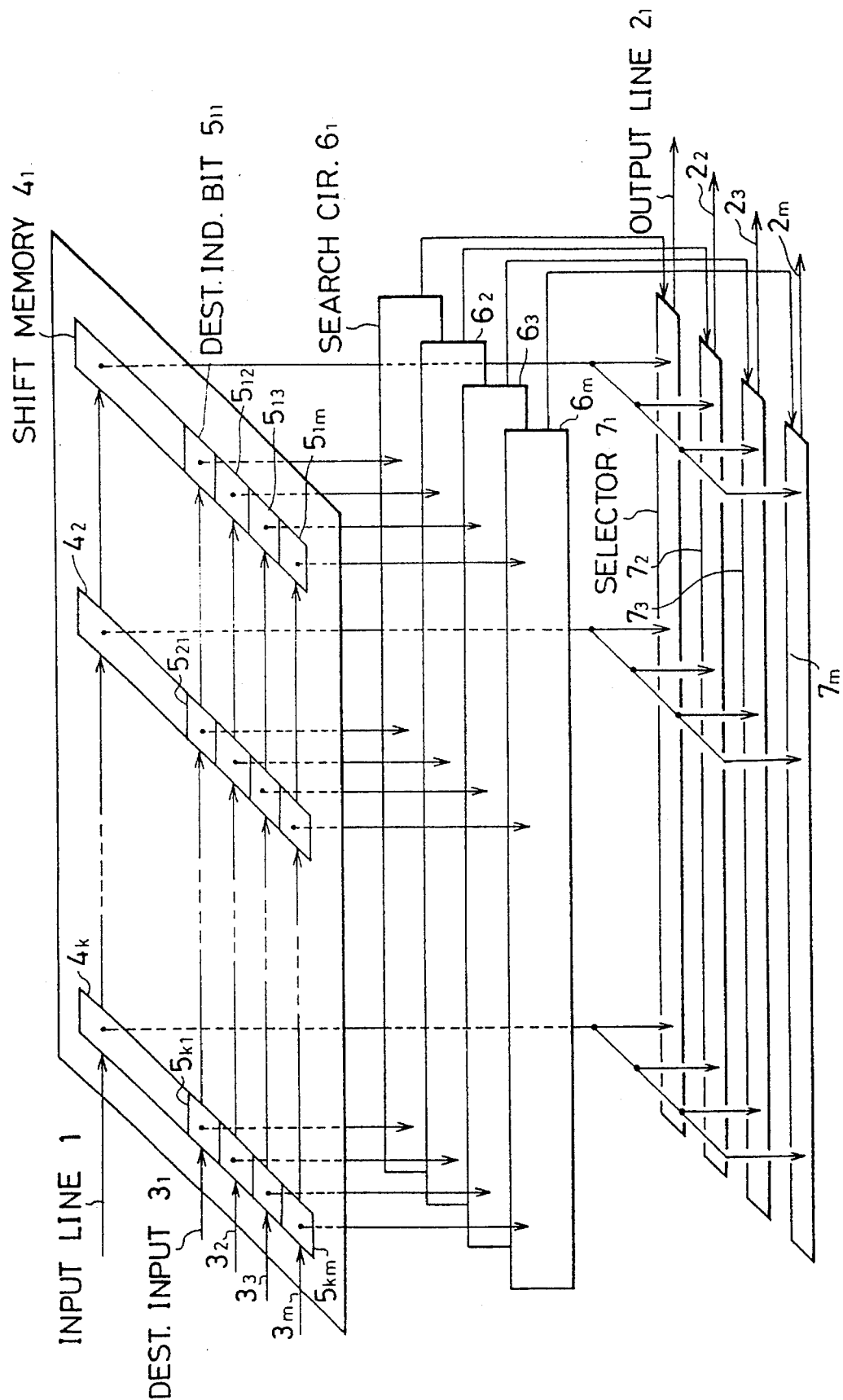
FIG. 17 is a block diagram of the memory configuration of the data queuing apparatus according to the other embodiment of this invention.

In the above Embodiments 1 and 2, the shift memories and the destination indicating bits are configured as different memories. But the same memory unit can be used for the shift memories and the destination indicating bits as shown in FIG. 17. For example, when the shift memory has eight bits and the destination indicating bits have four bits, twelve bits are combined as one memory unit. The received data and the destination inputs can be stored by the memory unit of twelve bits.

Embodiment 13.

The above Embodiments 1 and 2 show the apparatus in which the selectors are provided correspondingly to each output lines, but another apparatus can be configured with fewer selectors. For example, each selector may correspond to two output lines as shown in FIG. 18. In this embodiment, the selectors operate at twice the speed of the selectors in Embodiments 1 and 2, achieving the same effect as in the above embodiments can be attained.

Embodiment 14.

The above Embodiment 4 and 13 show the apparatus in which the numbers of the search circuits and the selectors can be reduced by operating the search circuits and the selectors at a high speed. The numbers of the search circuits and the selectors can also be reduced even if they do not operate at a high speed as follows.

FIG. 19 shows the operation of the apparatus as configured as shown in FIG. 18. In the above Embodiments 1 and 2 (also in Embodiment 4 and 13), the data is transmitted every 4 time slots, but this embodiment shows the case in which the data is transmitted every time slot. The search circuit $6_1$ searches and detects the existence of the data to be transferred to the output lines $2_1$ and $2_2$ alternately every time slot. The selector $7_1$ also transmits the data, if there is any, to the output lines $2_1$ and $2_2$ alternately every time slot. In this way, the search circuit and the selector do not need to operate at a high speed while detecting and transmitting the data every time slot. In FIG. 19, more effective operation can be achieved. The apparatus in this embodiment can transmit data every time slot, not every fourth slot, even if it operates at the same speed as in Embodiments 1 and 2.

Embodiment 15.

Figure 20:
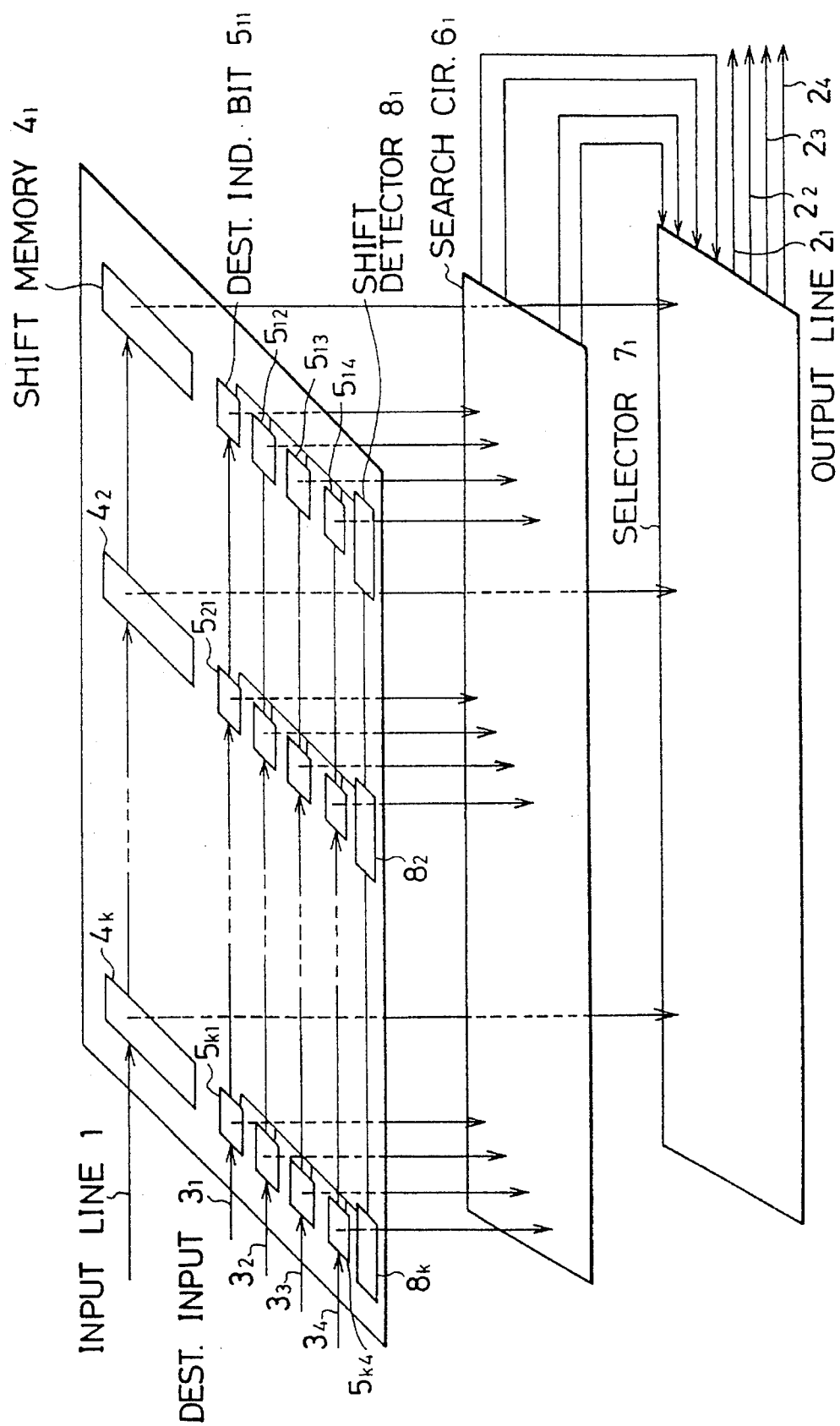
FIG. 20 is a block diagram of the apparatus comprising one detector and one selector according to another embodiment of this invention.

Another apparatus can be provided using one search circuit and one selector as shown in FIG. 20. In this case, if the search circuit 6 and the selector 7 operate at four times the speed of the search circuits in Embodiments 1 and 2, the same effect can be attained as in the above embodiments.

Embodiment 16.

FIG. 21 shows the operation of the apparatus configured as shown in FIG. 20, but in this case, the search circuit and the selector operate at the same speed as in Embodiments 1 and 2.

The search circuit detects and the selector transmits the data to be transferred to each output line once every time slot in the case shown in FIG. 21. Therefore, the same effect can be attained by detecting and selecting the data to be transferred to each output line once every time slot. In this case, the apparatus needs only one search circuit 6 and one selector 7, in addition, they do not need to operate at a high speed, so that the circuits are simply configured.

Embodiment 17.

Figure 22:
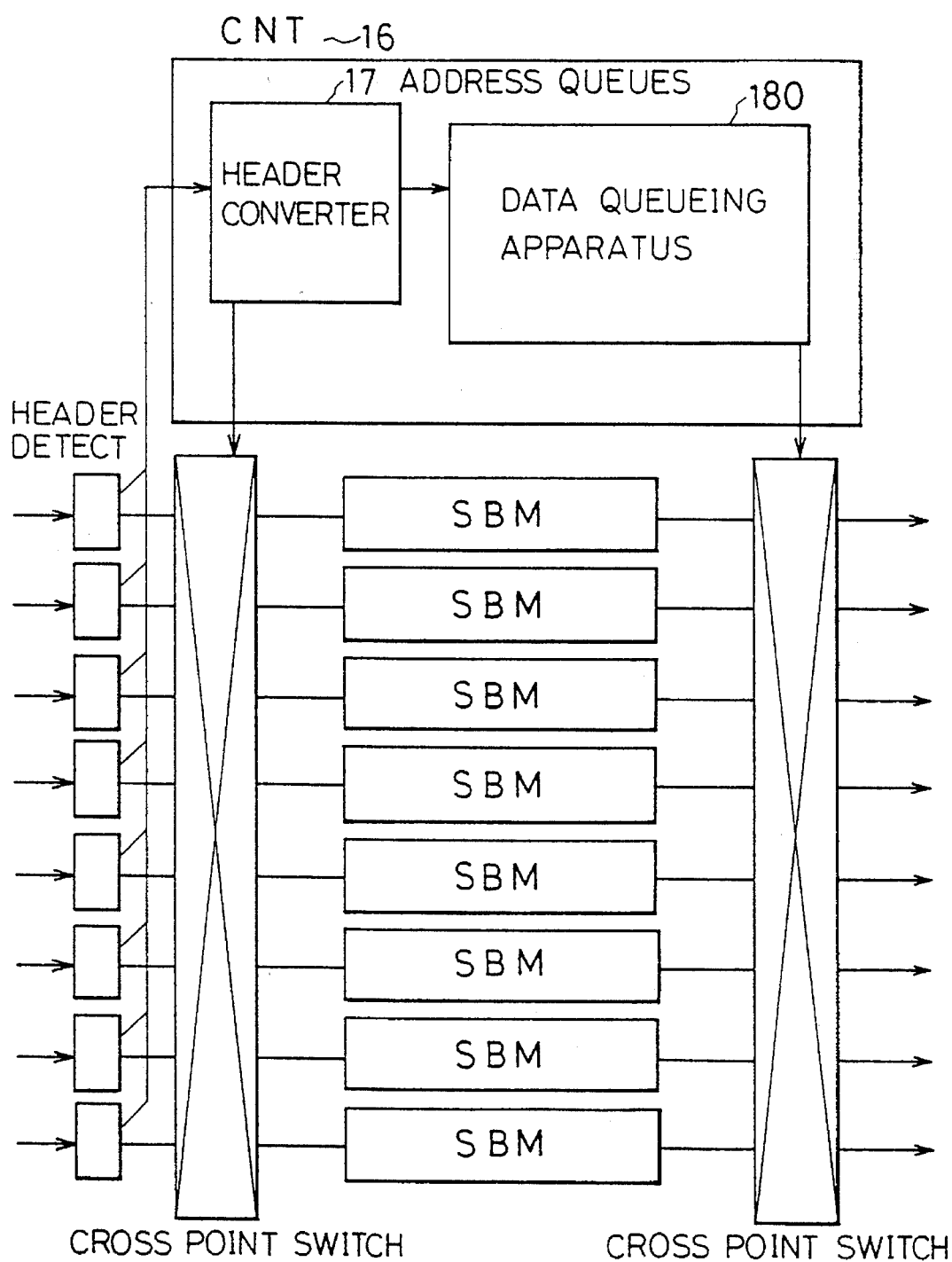
FIG. 22 is a block diagram showing the shared multibuffer ATM switch according to another embodiment of this invention.

FIG. 22 shows an example of a shared multibuffer ATM switch. This shared multibuffer ATM switch is characterized by adopting in the controller 16 the data queuing apparatus 180 described above.

Figure 23:
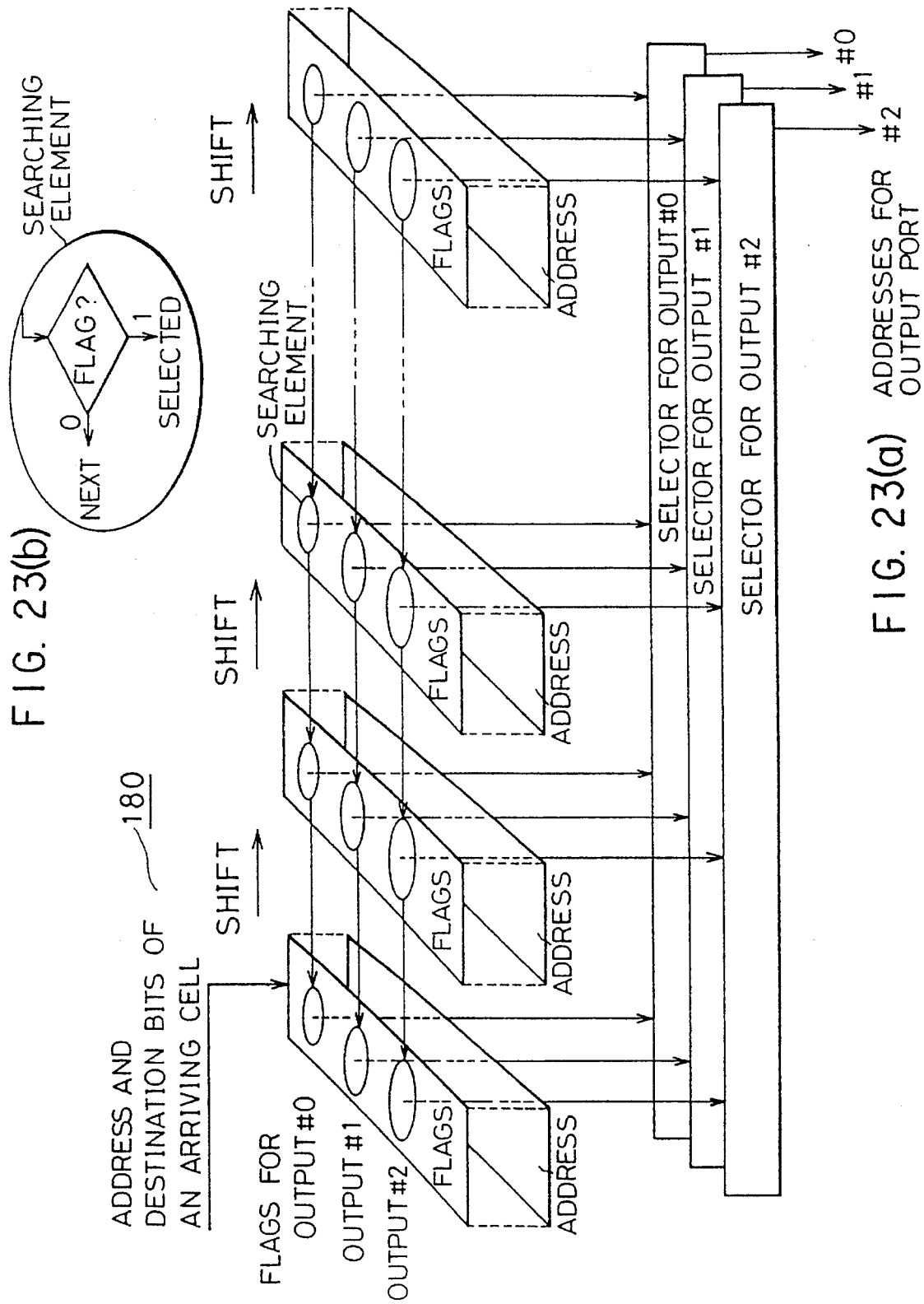
FIG. 23 show a configuration of the data queuing apparatus in the shared multibuffer ATM switch according to the embodiment of this invention.

FIG. 23 shows a configuration of the data queuing apparatus 180. The data queuing apparatus 180 has the same function as the data queuing apparatus described in Embodiment 1. Flags correspond to the above-described destination indicating bits which store the destination information. Address corresponds to the data stored in the above-described shift memories. And a searching element corresponds to the above-described search circuit.

Figure 24:
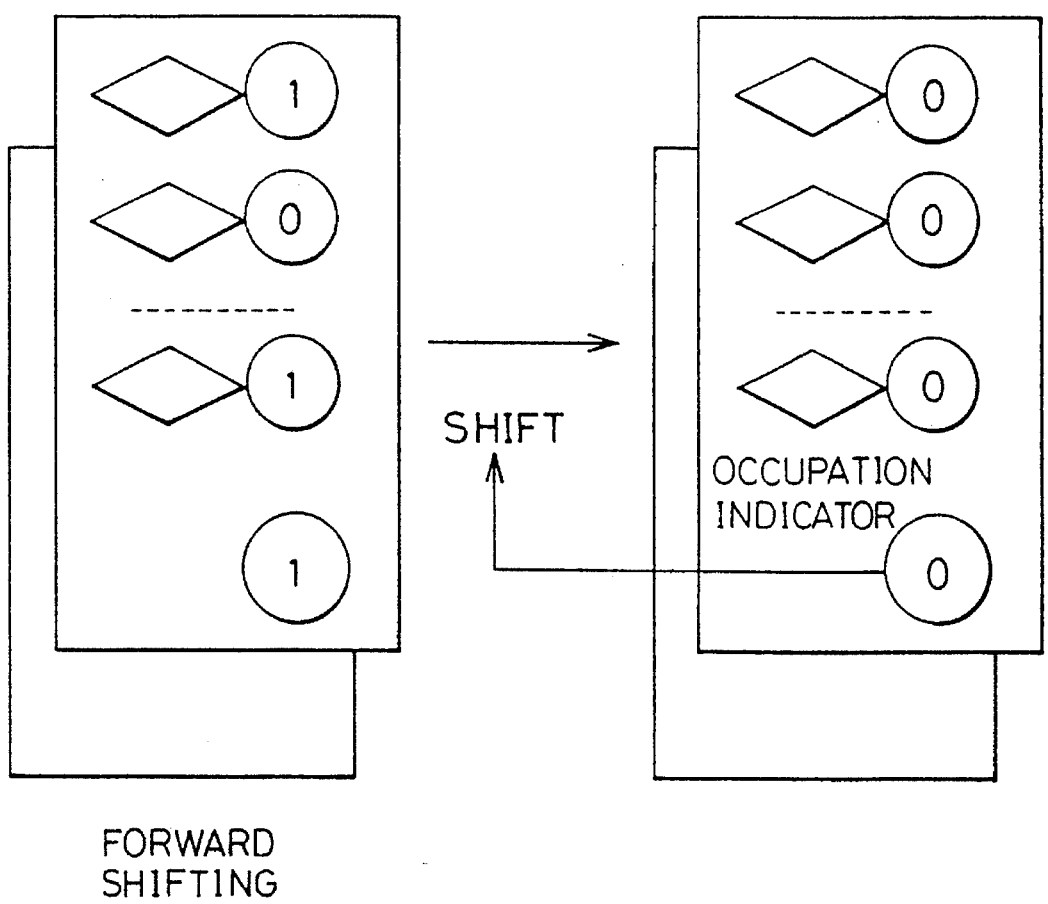
FIG. 24 shows the shift operation according to the embodiment of this invention.

FIG. 24 shows a shift operation. The value of an occupation indicator becomes "0" when all of the flags are "0". When the occupation indicator indicates "0", the data stored in the previous stage is shifted to the next.

Figure 25:
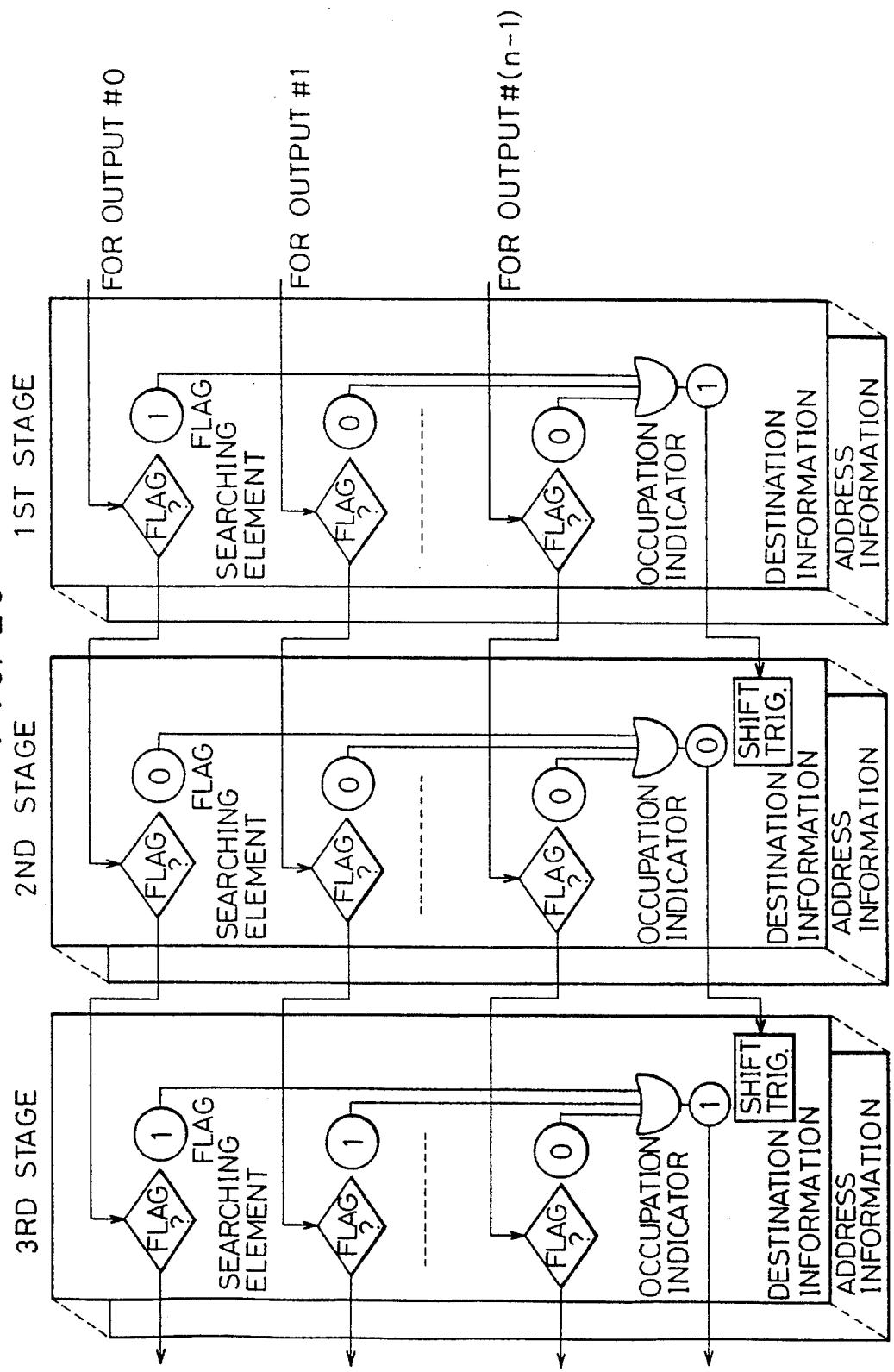
FIG. 25 shows the operation of forward shifting according to the embodiment of this invention.

FIG. 25 explains the forward shifting shown in FIG. 24. In the first stage, the flags have been set 1, 0, 0, so that the occupation indicator indicates "1" as shown in FIG. 25. The value of the occupation indicator is transmitted to a shift trigger of the second stage. The shift trigger shifts the data which are stored in the stage where the shift trigger exists, to the next stage when the value of the occupation indicator becomes "0". In the second stage, the flags are all "0", so that the occupation indicator indicates "0". The shift trigger of the third stage shifts the address and the destination indication, stored in the third stage, to the second stage.

Figure 26:
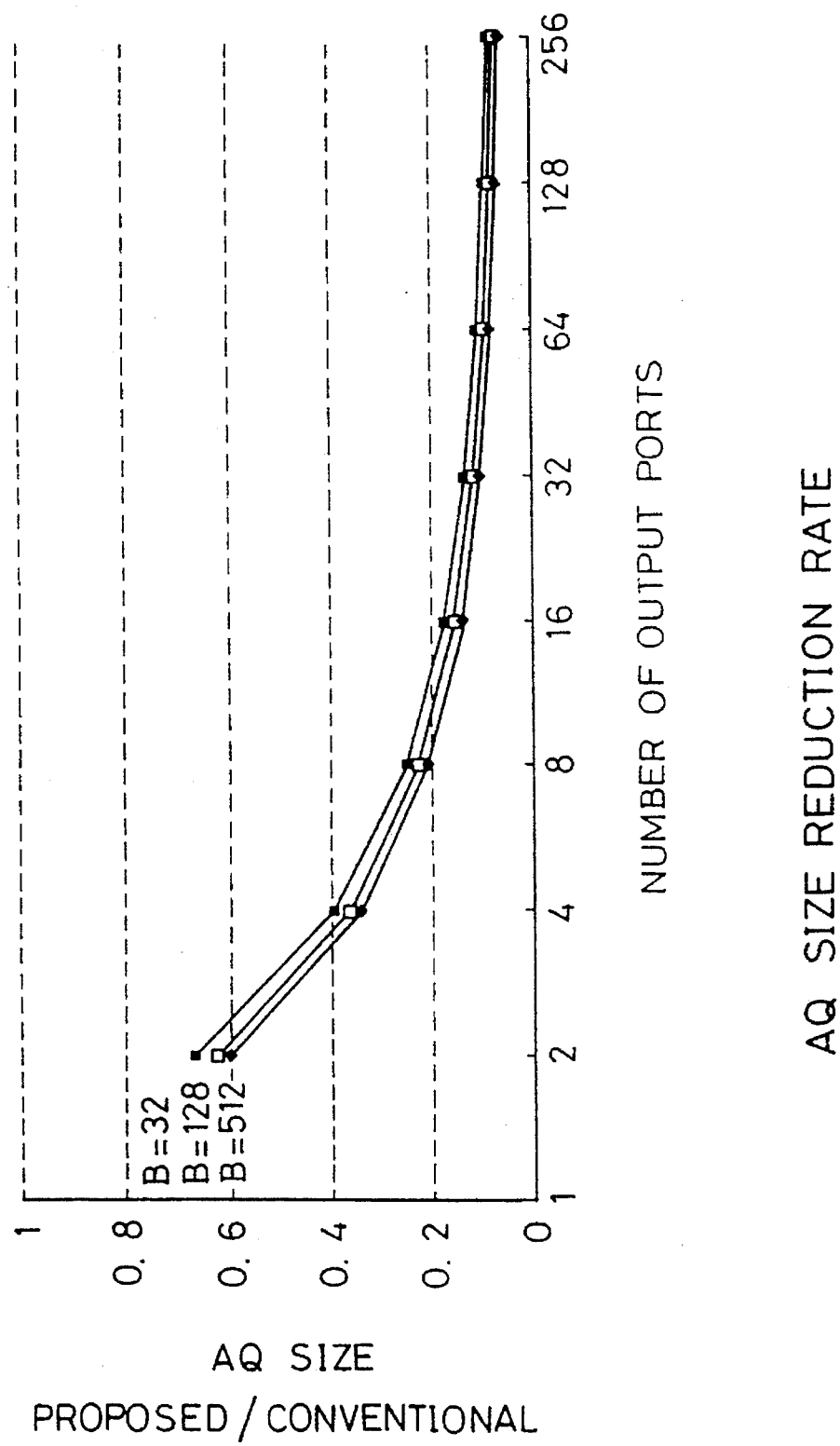
FIG. 26 is a chart comparing the memory size of the data queuing apparatus according to this invention and the conventional data queuing apparatus.

FIG. 26 is a graph comparing the memory size needed by the conventional data queuing apparatus and by the data queuing apparatus according to this embodiment. In FIG. 26, the horizontal axis shows the number of the output lines and the vertical axis shows the ratio of the memory size needed by the apparatus according to this embodiment to the memory size needed by the conventional apparatus. The graph shown in FIG. 26 is made using the formula as shown in FIG. 27. As shown in FIG. 26, the more output ports the apparatus has, the smaller memory size is needed by the data queuing apparatus of this embodiment compared with the conventional apparatus.

Embodiment 18.

FIG. 28 shows another embodiment for shifting the data stored in the shift memories. In the above embodiments, the data stored in the shift memories are shifted forward once every time slot. It is desirable to shift the stored data a plurality of times every time slot as shown in FIG. 28, not to shift data once every time slot. In this case, data are received every time slot, and the received data can be certainly stored in the shift memories by previously shifting forward the stored data.

Embodiment 19.

Figure 29:
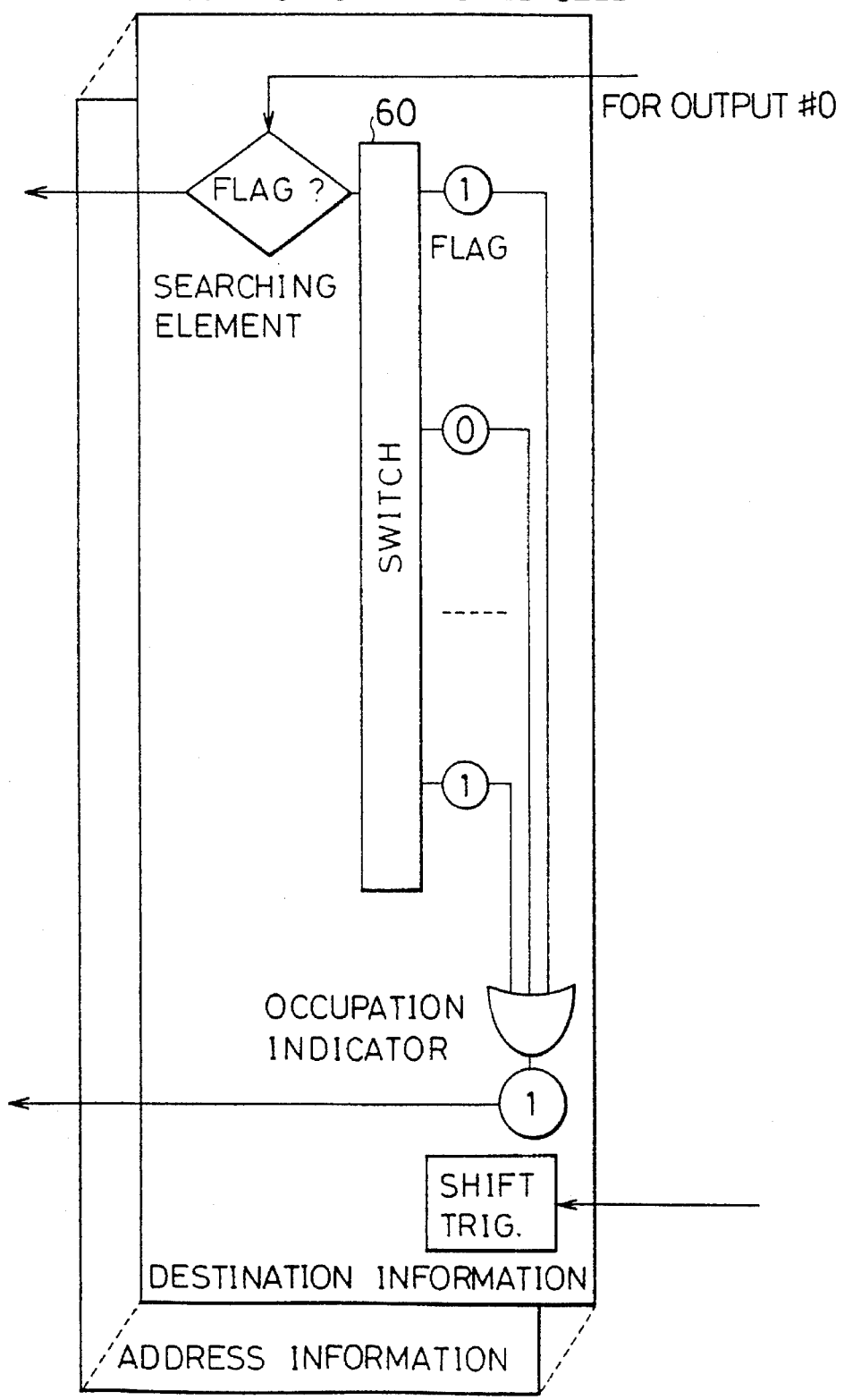
FIG. 29 shows the operation of the searching element according to another embodiment of this invention.
Figure 30:
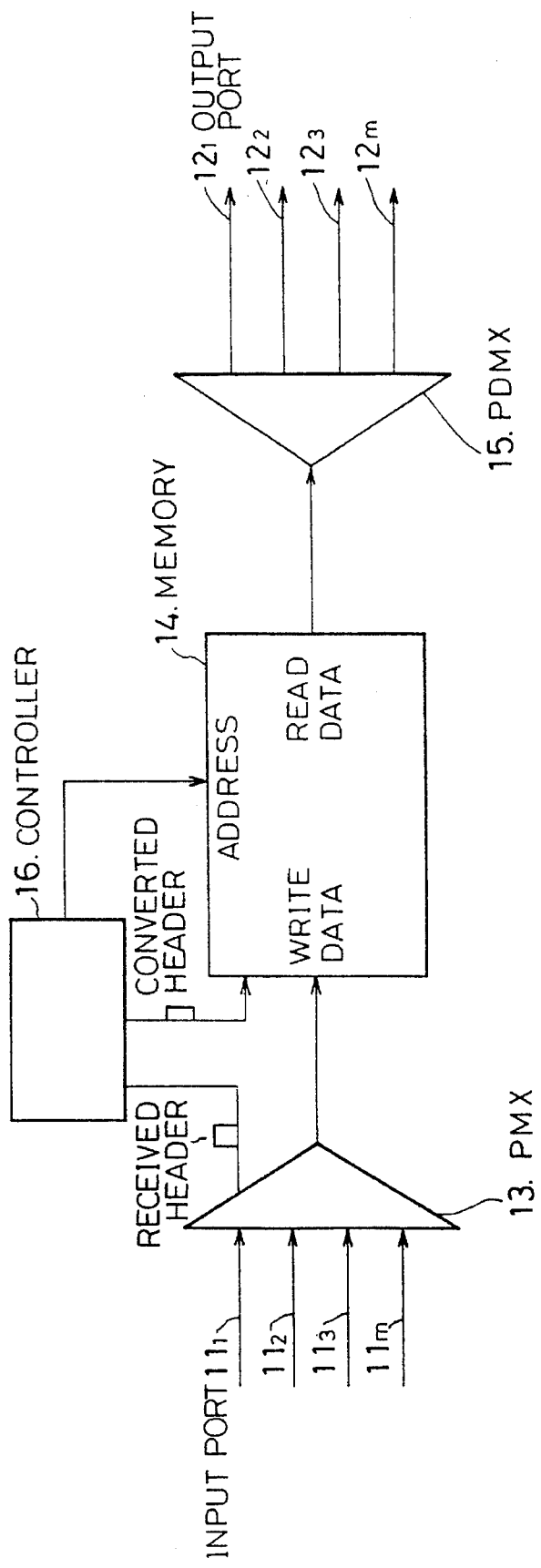
FIG. 30 is a block diagram of the high speed packet switch including a conventional data queuing apparatus.

FIG. 29 shows another example of the searching element. In the above embodiment, the searching element is provided correspondingly to each output line. In this embodiment, the searching element is provided in common for a plurality of the output lines. A switch 60 is provided for the searching element, and the switch changes the connections with the flags for searching each flag sequentially. In this case, the searching element may operate at a high speed, or the searching element may not operate at a high speed for searching the data to be transmitted to each output line once every time slot. In this embodiment, the same effect can be attained as in the above embodiments.

Embodiment 20.

Each of the flags is not needed to be 1 bit, but it can consist of 2 or more bits, not shown in the figure. When a flag has 2 or more bits, the priorities of the data can be processed.

The invention has been described in connection with a number of specific embodiments. These embodiments are given by way of example only, and the scope of the invention is limited only by the scope of the appended claims.

What is claimed is:

1. A data queuing apparatus comprising:
   (a) a plurality of output lines for transmitting data;
   (b) input means for receiving data having associated therewith destination information which indicates at least one of the output lines;
   (c) memory means, which is provided for the plurality of output lines, for storing data and destination information received at the input means; and
   (d) search means which searches outgoing destination information for each output line from among the destination information stored in the memory means; and
   (e) select means which selects data in the memory means corresponding to an output line designated by the destination information searched for transmitting.

2. The data queuing apparatus of claim 1, wherein the memory means comprises:
   (a) a plurality of shift memories for shifting data and storing data therein;
   (b) a plurality of destination memories each of which corresponds to both each shift memory and each output line and stores the destination information of data therein.

3. The data queuing apparatus of claim 2, wherein the search and select means comprises a plurality of search means each of which corresponds to each of the plurality of the output lines and searches destination information stored in the corresponding destination memories for finding data to transmit to the corresponding output line.

4. The data queuing apparatus of claim 3, wherein the search and select means comprises search means whose number is less than the number of output lines.

5. The data queuing apparatus of claim 2, wherein the search and select means comprises a plurality of select means each of which corresponds to each of the plurality of output lines and selects data found by the search means and transmits data to the corresponding output line.

6. The data queuing apparatus of claim 5, wherein the search and select means comprises select means whose number is less than the number of output lines.

7. The data queuing apparatus of claim 2, further comprising a plurality of shift detectors, each of which corresponds to each of the shift memories, for requesting a previous shift memory to shift data when it detects selecting and transmitting of the data stored in the corresponding shift memory.

8. The data queuing apparatus of claim 2, wherein the input means expects to receive data every time slot, every time slot having a predefined time length, the plurality of shift memories shift data more than once every time slot, and the search and select means searches data once every predefined X (X>=2) time slot.

9. The data queuing apparatus of claim 2, wherein the input means expects to receive data each time slot each time slot having a predefined time length, and wherein the input means includes Y (Y>=2) number of input lines which are coupled to the Y number of shift memories respectively for receiving data into the coupled shift memory once during every time slot, and wherein the plurality of shift memories shift data Y number of times for every time slot.

10. The data queuing apparatus of claim 2, wherein the shift memory and the destination memory are coupled together as a memory unit.

11. The data queuing apparatus of claim 2, wherein the input means receives the destination information, along with priority for processing data, the memory means stores the destination information and the priority, and the search and select means searches the destination information for selecting data based on the stored priority.

12. The data queuing apparatus of claim 1, further comprising delete means for deleting data stored in the memory means after being selected and transmitted by the search and select means.

13. The data queuing apparatus of claim 12, wherein input means receives data with destination information, indicative of destination output lines, and the delete means deletes data after they are transmitted to the plurality of output lines indicated by the destination information.

14. The data queuing apparatus of claim 1, wherein the input means receives a serial signal and includes serial-parallel converter for transforming the serial signal to the parallel signal, and the memory means receives the parallel signal from the serial-parallel converter.

15. The data queuing apparatus of claim 1, for processing data of a first priority level and further for processing data of a second priority level different from the first priority level, further comprising:
   second data queuing apparatus for processing the data having the second priority level;
   data distributing means for inputting data having associated therewith a priority level and transferring data to one of the first and second data gueuinq apparatuses based on the priority level associated with the inputted data.

16. The data queuing apparatus of claim 15, the second data queuing apparatus comprising:
   (a) a plurality of output lines for transmitting data;
   (b) input means for receiving data having associated therewith destination information which indicates at least one of the output lines;
   (c) memory means, which is provided for the plurality of output lines, for storing data and destination information received at the input means; and
   (d) search means which searches outgoing destination information for each output line from among the destination information stored in the memory means; and
   (e) select means which selects data in the memory means corresponding to an output line designated by the destination information searched for transmitting.

17. The data queuing apparatus of claim 1, embedded in an Asynchronous Transfer Mode switch for switching cells, having destination information therewith, between input ports and output ports, comprising:
   (a) a shared multibuffer having addresses for storing cells;

(b) a controller for controlling the data queuing apparatus, providing the addresses, whereat the cells are stored in the shared multibuffer along with corresponding destinations of the stored cells, and for controlling the data queuing apparatus to transmit the addresses of cells to be transmitted to the output ports.

18. A data queuing apparatus comprising:

(a) an input line for receiving a limited length of data defined by a predefined fixed time;

(b) a plurality of output lines for transmitting a limited length of data;

(c) destination input means, associated with the input line, for receiving destination information separate from and corresponding to the data, the destination information indicating one of the plurality of output lines;

(d) a plurality of shift memories, which are connected serially, for storing received data from the input line and for shifting stored data forward serially;

(e) a plurality of storage elements holding destination indicating bits, each storage element of which corresponds to one of the shift memories and to one of the output lines, and each storage element holds a destination bit which is asserted when the bit corresponds to a destination of data stored in the corresponding one of the shift memories, the plurality of storage elements storing the destination received at the destination input means, and shifting the stored destination synchronous with the shifting of the data stored in the corresponding shift memories;

(f) search circuits, each of which corresponds to each of the output lines, for searching backward for an asserted bit in the destination indicating bits; and (g) selectors for selecting data from the plurality of shift memories to the output lines based on search results of the search circuits.

19. The data queuing apparatus of claim 18, wherein the limited length of data is transmitted to the plurality of output lines, further comprising shift detectors, each of which corresponds to each of the shift memories, for detecting that all of the destination indicating bits which correspond to one of the shift memories are not asserted and directing next shift memory and next destination indicating bits to shift data and the destination forward.

20. A data queuing method comprising the steps of:

(a) receiving data and corresponding destination information from an input line every time slot;

(b) separately storing data and the corresponding destination information in a common memory in an order;

(c) searching the destination information in the order for destinations corresponding to each of a plurality of output lines;

(d) selecting data for each of the plurality of output lines based on a search result;

(e) transmitting selected data to each of output lines.

21. The data queuing method of claim 20, wherein the receiving step comprises the steps of:

(a) checking if the common memory is full of data; and (b) discarding data received if the common memory is full of data.

22. The data queuing method of claim 20, further comprising the step of after the step of transmitting, marking in a location in the memory that data transmitted from the common memory as deleted.

23. The data queuing method of claim 22, wherein the storing step comprises the steps of (a) checking if the common memory holds the data marked as deleted;

(b) shifting other data in the common memory onto the data marked as deleted if the common memory holds the data marked as deleted.

24. The data queuing method of claim 20, further comprising, before the step of searching, the step of repeating the receiving step and the storing step a plurality of times.

25. An Asynchronous Transfer Mode switch for switching cells, having destination information associated therewith, between input ports and output ports, comprising:

(a) a shared multibuffer having addresses for storing cells;

(b) a controller having a common address queue for queuing the addresses of cells stored in the shared multibuffer along with the destination information, the common address queue including memory means for storing the addresses and the destination information of cells, and select means for selecting addresses for each of the output ports based on the destination information.

26. The Asynchronous Transfer Mode switch of claim 24, wherein the memory means comprises a plurality of shift memories for storing addresses and destination information, and searching elements for searching destination information stored in the shift memories.

27. The Asynchronous Transfer Mode switch of claim 26, wherein each of the shift memories comprises occupation indicator for indicating an occupation status of the shift memory, and shift trigger for shifting addresses and destination information to another shift memory based on the occupation status indicated by the occupation indicator in the other shift memory.

* * * * *